(12) United States Patent
Sokolsky et al.

(10) Patent No.: US 9,152,297 B2
(45) Date of Patent: Oct. 6, 2015

(54) INTERACTIVE CONTENT CREATION SYSTEM

(71) Applicant: Udacity, Inc., Mountain View, CA (US)

(72) Inventors: Michael Sokolsky, Palo Alto, CA (US); David Stavens, Palo Alto, CA (US); Irene Au, Palo Alto, CA (US); Jacques Favreau, Monrovia, CA (US); Sebastian Thrun, Palo Alto, CA (US); Joakim Arfvidsson, Palo Alto, CA (US)

(73) Assignee: Udacity, Inc., Mountain View, CA (US)

( * ) Notice: Subject to any disclaimer, the term of this patent is extended or adjusted under 35 U.S.C. 154(b) by 0 days.

(21) Appl. No.: 13/660,457

(22) Filed: Oct. 25, 2012

(65) Prior Publication Data

US 2014/0123067 A1    May 1, 2014

(51) Int. Cl.
| | |
|---|---|
| *G06F 3/0481* | (2013.01) |
| *G06F 3/0486* | (2013.01) |
| *G06F 9/44* | (2006.01) |
| *G09B 5/06* | (2006.01) |
| *G09B 7/00* | (2006.01) |
| *G09B 7/08* | (2006.01) |

(52) U.S. Cl.
CPC .............. *G06F 3/04817* (2013.01); *G06F 8/34* (2013.01); *G09B 5/06* (2013.01); *G09B 7/00* (2013.01); *G09B 7/08* (2013.01)

(58) Field of Classification Search
CPC ... G06F 3/0481; G06F 3/0482; G06F 3/0484; G06F 3/04817
See application file for complete search history.

(56) References Cited

U.S. PATENT DOCUMENTS

| | | | |
|---|---|---|---|
| 6,606,479 B2 * | 8/2003 | Cook et al. | 434/350 |
| 7,677,896 B1 * | 3/2010 | Sonwalkar | 434/236 |
| 8,068,104 B2 | 11/2011 | Rampersad | |
| 2002/0078103 A1 * | 6/2002 | Gorman et al. | 707/530 |

(Continued)

FOREIGN PATENT DOCUMENTS

| | | |
|---|---|---|
| WO | WO-2014066614 A2 | 5/2014 |
| WO | WO-2014066614 A3 | 5/2014 |

OTHER PUBLICATIONS

International Application Serial No. PCT/US2013/066577, International Search Report mailed May 2, 2014, 3 pgs.

(Continued)

*Primary Examiner* — Phenuel Salomon
*Assistant Examiner* — Daniel Samwel
(74) *Attorney, Agent, or Firm* — Schwegman Lundberg & Woessner, P.A.

(57) ABSTRACT

According to various embodiments, a user interface (UI) includes a precedence graph area and an icon list displaying multiple types of program icons. A user selection of one of the program icons is received, the user selection corresponding to moving the selected program icon to the precedence graph area, the selected program icon referencing a composer UI to generate content of a specific media type. The selected program icon is characterized as a first program-content-pairing icon that references the content created by the composer UI. Thereafter, a user interaction with a plurality of program-content-pairing icons in the precedence graph area is detected, the user interaction corresponding to specifying an ordering of the plurality of program-content-pairing icons. A program flow precedence graph referencing a program flow of an interactive program is the generated, based on the ordering of the program-content-pairing icons in the precedence graph area.

20 Claims, 32 Drawing Sheets

(56) References Cited

U.S. PATENT DOCUMENTS

| | | |
|---|---|---|
| 2003/0101025 A1 | 5/2003 | Shah et al. |
| 2005/0278059 A1* | 12/2005 | Osborn et al. ............... 700/181 |
| 2006/0053407 A1 | 3/2006 | Kodosky et al. |
| 2007/0020604 A1* | 1/2007 | Chulet ........................ 434/350 |
| 2008/0174570 A1 | 7/2008 | Jobs et al. |
| 2008/0195972 A1 | 8/2008 | Lacey et al. |
| 2009/0064092 A1* | 3/2009 | Roberts et al. ............... 717/105 |
| 2009/0307626 A1 | 12/2009 | Jalon et al. |
| 2010/0211638 A1 | 8/2010 | Rougier |
| 2010/0231790 A1 | 9/2010 | Ansari et al. |
| 2010/0251281 A1* | 9/2010 | Craner ........................ 725/23 |
| 2011/0161852 A1 | 6/2011 | Vainio et al. |
| 2011/0314422 A1 | 12/2011 | Cameron et al. |
| 2012/0015340 A1 | 1/2012 | Beamish et al. |
| 2012/0227075 A1 | 9/2012 | Asmussen |
| 2012/0240025 A1 | 9/2012 | Migos et al. |
| 2012/0254842 A1 | 10/2012 | Henderson |
| 2012/0308980 A1* | 12/2012 | Krauss ........................ 434/362 |

OTHER PUBLICATIONS

International Application Serial No. PCT/US2013/066577, Written Opinion mailed May 2, 2014, 7 pgs.

\* cited by examiner

Set performance value criteria of Q

● Performance Value = No. of correct answers

○ Performance Value = % of questions answered correctly

○ Performance Value = ☐ if no. of correct answers =

☐ = ☐ if no. of correct answers =

[ Set ] [ Cancel ]

INTERACTIVE CONTENT CREATION SYSTEM

TECHNICAL FIELD

The present application relates generally to the technical field of interactive content and, in one specific example, to an interactive content creation system.

BACKGROUND

In an academic setting such as a classroom of a school or university, various types of educational content may be created and utilized by an instructor. For example, the instructor may create markings on a whiteboard, or type and print a quiz onto a sheet of paper, or refer to content in a physical text. In certain cases, classes conducted by an instructor may be recorded as a conventional video by a traditional video recorder, so that the recorded educational content may be provided to remote students that are not able to attend the classes in person.

BRIEF DESCRIPTION OF THE DRAWINGS

Some embodiments are illustrated by way of example and not limitation in the figures of the accompanying drawings in which:

FIG. 22 illustrates an exemplary portion of a user interface window, according to various embodiments.

DETAILED DESCRIPTION

Example methods and systems for interactive content creation are described. In the following description, for purposes of explanation, numerous specific details are set forth in order to provide a thorough understanding of example embodiments. It will be evident, however, to one skilled in the art that the present invention may be practiced without these specific details.

Figure 1:
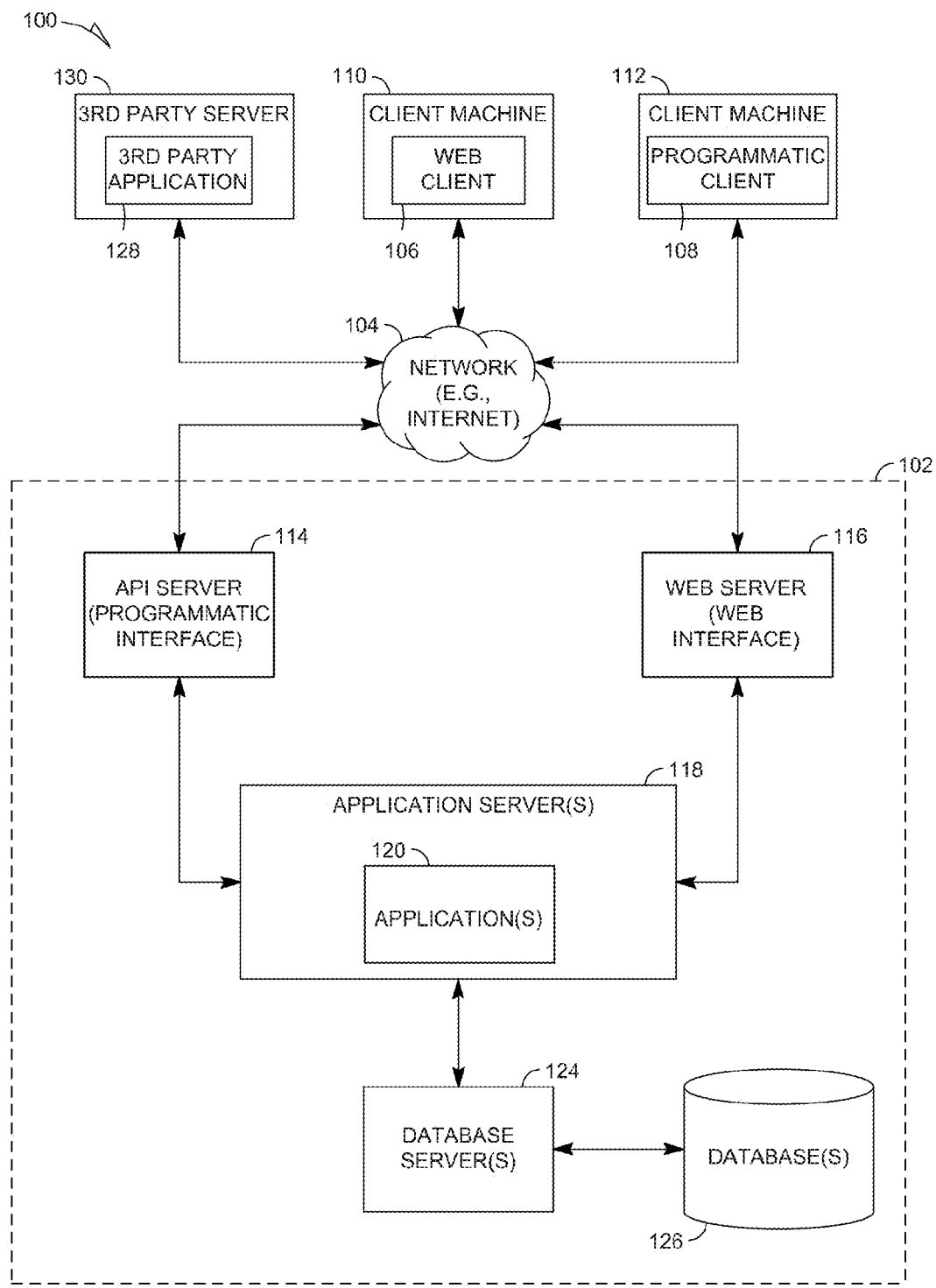
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
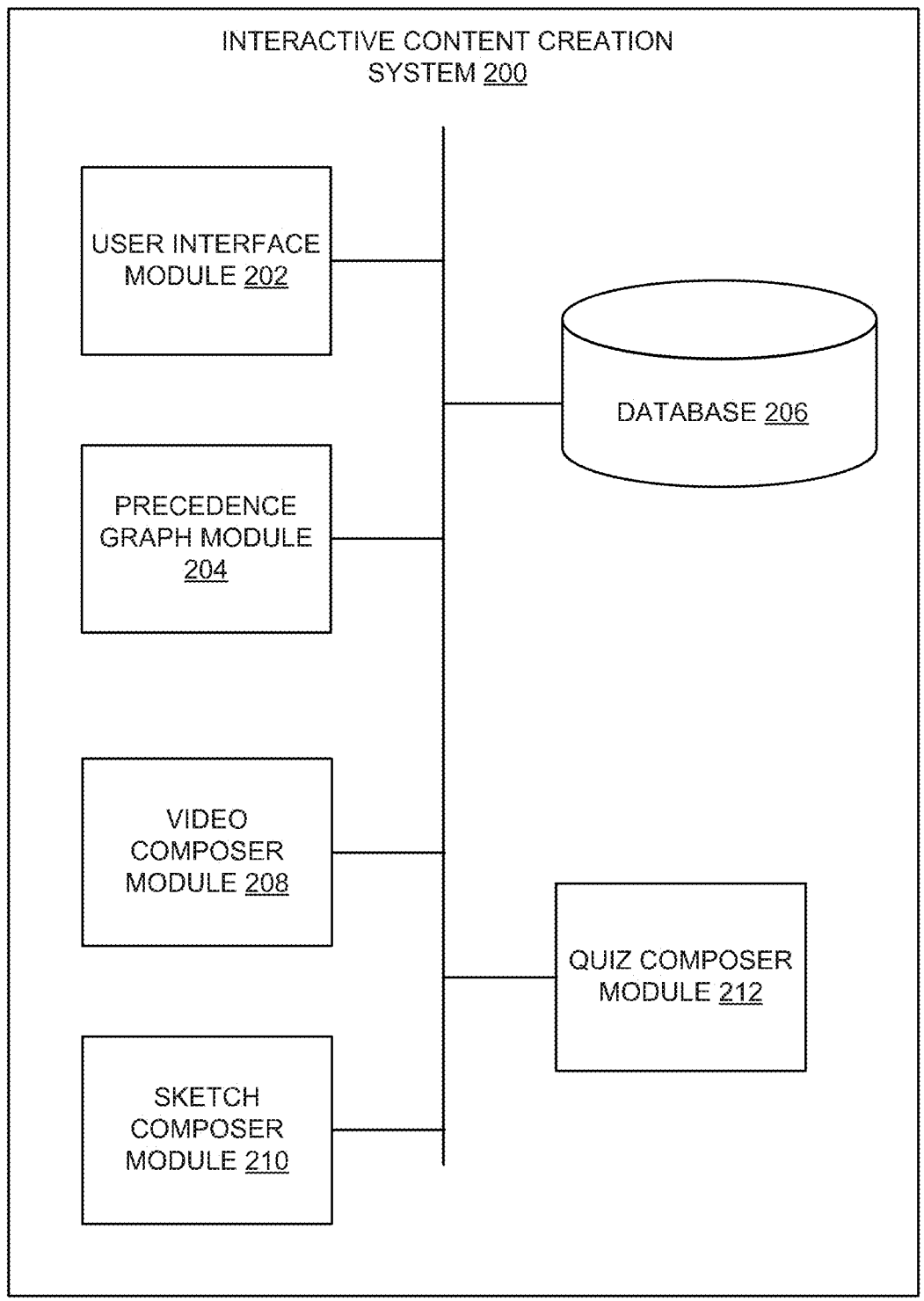
FIG. 2 is a block diagram of an example system, according to various embodiments.

Turning now to FIG. 2, an interactive content creation system 200 includes a user interface module 202, a precedence graph module 204, and a database 206. The modules of the interactive content creation system 200 may be implemented on a single device such as an interactive content creation device, or on separate devices interconnected via a network. The aforementioned interactive content creation device may correspond to, for example, one of the client machines (e.g. 110, 112) or application server(s) 118 illustrated in FIG. 1.

Figure 3:
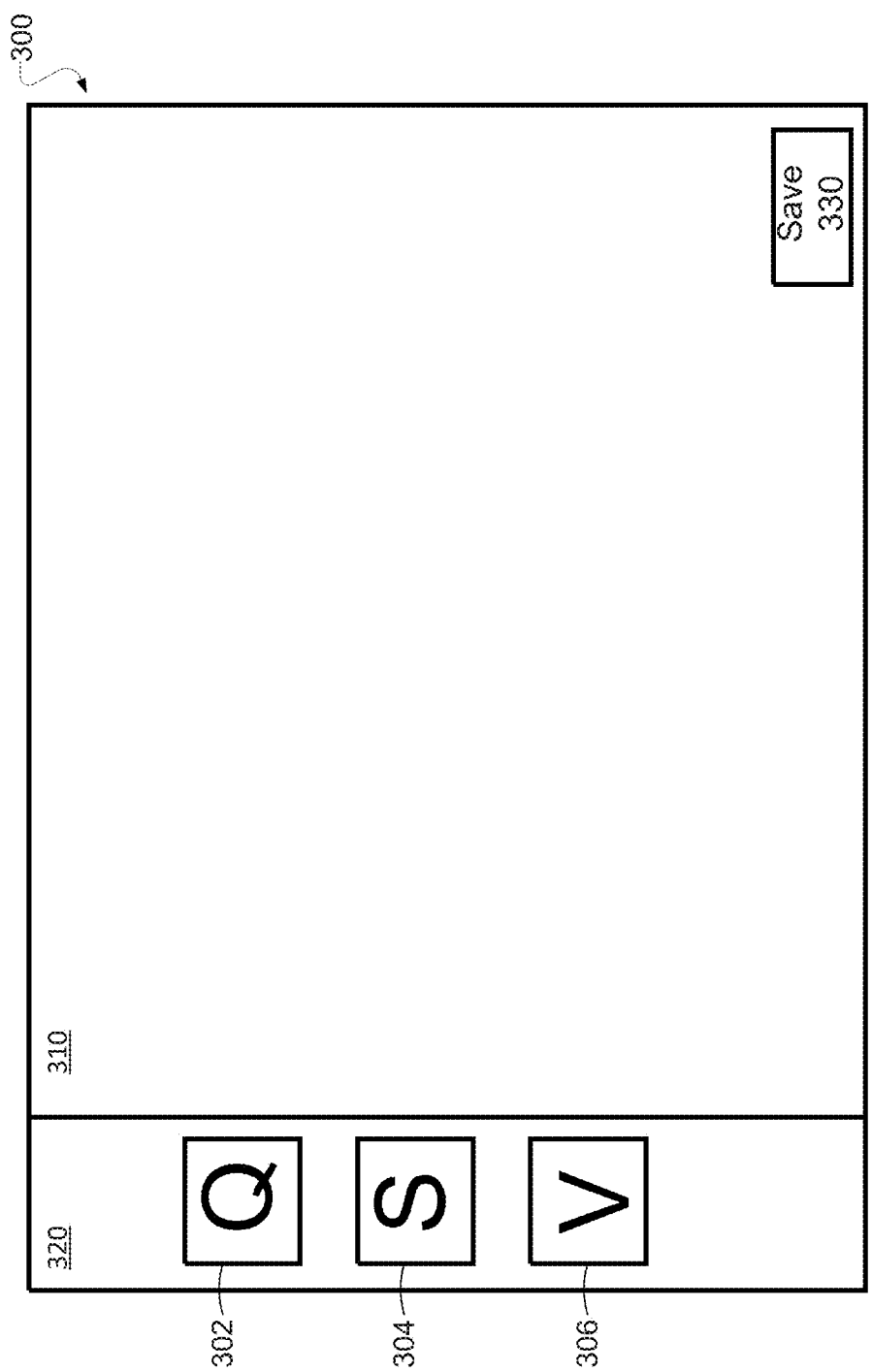
FIG. 3 illustrates an exemplary portion of a user interface window, according to various embodiments.

The user interface module 202 is configured to display a content creation user interface window on a client device (such as, for example, client machines 110, 112 illustrated in FIG. 1, which may correspond to personal computers, laptops, smart phones, tablet computing devices, etc.). FIG. 3 illustrates an example of content creation user interface window 300 generated by the user interface module 202 and displayed by the user interface module 202 on a client device. As illustrated in FIG. 3, the content creation user interface window 300 includes a precedence graph area 310, and an icon list 320 displaying multiple types of program icons, such as program icons "Q" 302 (hereinafter a quiz program icon), "S" 304 (hereinafter a sketch program icon), and "V" 306 (hereinafter of video program icon). As described in further detail below, the precedence graph area 310 effectively acts as a canvas for creating a program flow precedence graph that describes a program flow of an interactive program. The user may create the program flow precedence graph by dragging the appropriate icons (including program icons 302, 304, and 306) from the icon list 320 to the precedence graph area 310. The user may be, for example, a creator of interactive educational content, such as a teacher, instructor, educator, or professor.

Each of the program icons 302, 304, and 306 in the icon list 320 references a composer user interface (UI) configured to generate content of a specific media type. For example, the video program icon 306 references a video composer UI configured to generate video content. Similarly, the sketch program icon 304 references a sketch composer UI configured to generate sketch content. Likewise, the quiz program icon 302 references a quiz composer UI configured to generate quiz content. Such aspects will be described in further detail below. The video composer UI, sketch composer UI, and quiz composer UI may correspond to, or may be implemented by, a video composer module 208, sketch composer module 210, and quiz composer module 212, respectively (see FIG. 2). Thus, any references in this disclosure to an operation performed by a composer UI may be attributable to the corresponding module.

The user interface module 202 is configured to detect and receive a user selection of one or more of the program icons, such as the quiz program icon 302, sketch program icon 304, and/or video program icon 306. For example, the user interface module 202 may detect the user dragging one of the program icons 302, 304, 306 from the icon list 320 to the precedence graph area 310. Once a program icon is moved to the precedence graph area, that program icon calls/launches the composer UI referenced by that program icon. Alternatively, the composer UI referenced by that program icon may be launched by the user interface module 202, when the user interface module 202 detects that the program icon has been moved to the precedence graph area.

Figure 4A:
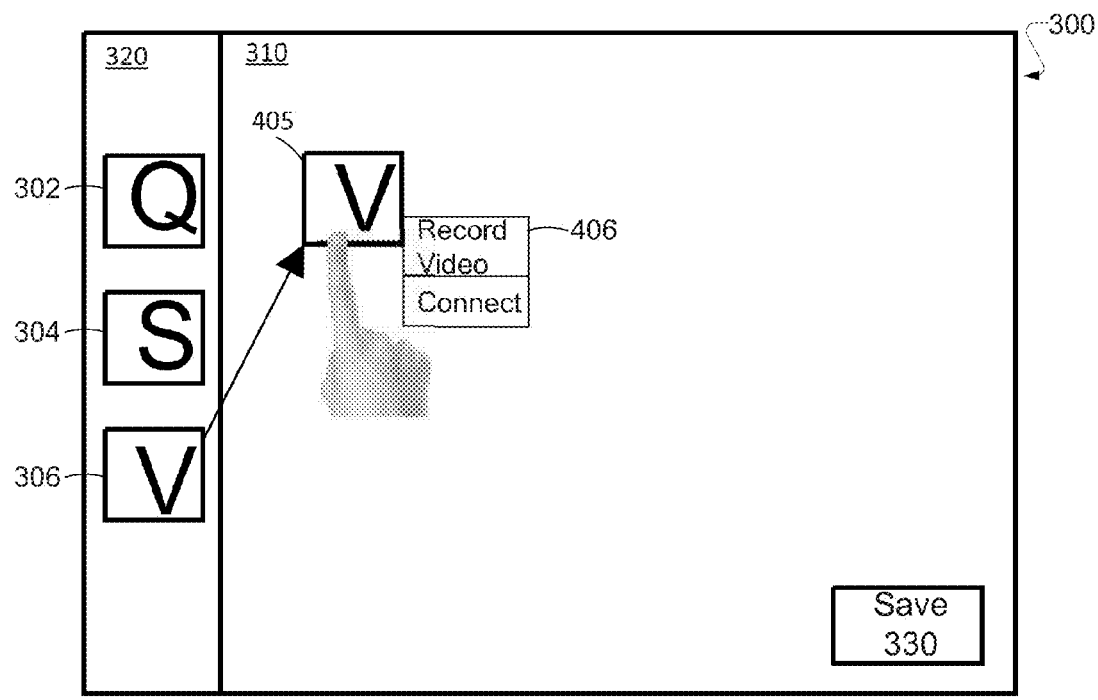
FIG. 4A illustrates an exemplary portion of a user interface window, according to various embodiments.

For example, as illustrated in FIG. 4A, once the user moves the video program icon 306 to the precedence graph area 310 resulting in moved video program icon 405, the video program icon 306 or the user interface module 202 calls/launches the video composer UI referenced by the video program icon 306. The video composer UI may be a UI of a video recorder application configured to record video content, such as a video recorder application of the smartphone or tablet computer operating in conjunction with a microphone and camera of the smartphone or tablet computer. When the video program icon 405 is moved to the precedence graph area 310, a pop-up user interface element 406 with a "Record Video" button may be displayed for user selection (see FIG. 4A), thereby initiating the video composer UI upon selection of the "Record Video" button in pop-up user interface element 406.

Figure 4B:
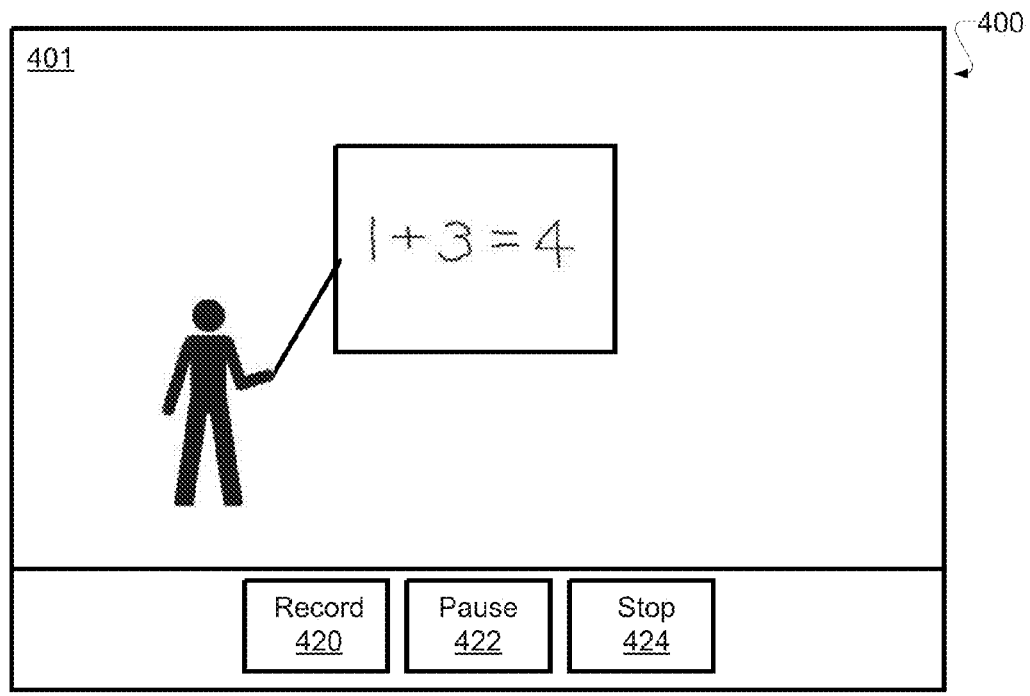
FIG. 4B illustrates an exemplary portion of a user interface window, according to various embodiments.

According to various embodiments, the launched video composer UI may permit the user of the smart phone to record, for example, a video of themselves talking, a video of themselves demonstrating something, a video of them talking while writing on a sheet of paper, on a whiteboard, in a word processing application, and so forth. According to an embodiment, the video composer UI may also allow the user to load an existing video file from the user's files and/or directories. For example, FIG. 4B illustrates an exemplary portion of a video composer UI 400. The composer UI 400 includes camera window 401, as well as a record button 420, pause button 422, and stop button 424. When the user selects the record button 420, any audio-visual input received is recorded in real-time as a video input with sound. For example, as illustrated in FIG. 4B, a camera is recording the user presenting a class on a blackboard, which is being recorded as a video with sound. A pause button 422 and a stop button 424 are also provided in the video composer UI 400. It is also possible that the video composer UI records audio without video, or video without audio.

Figure 5A:
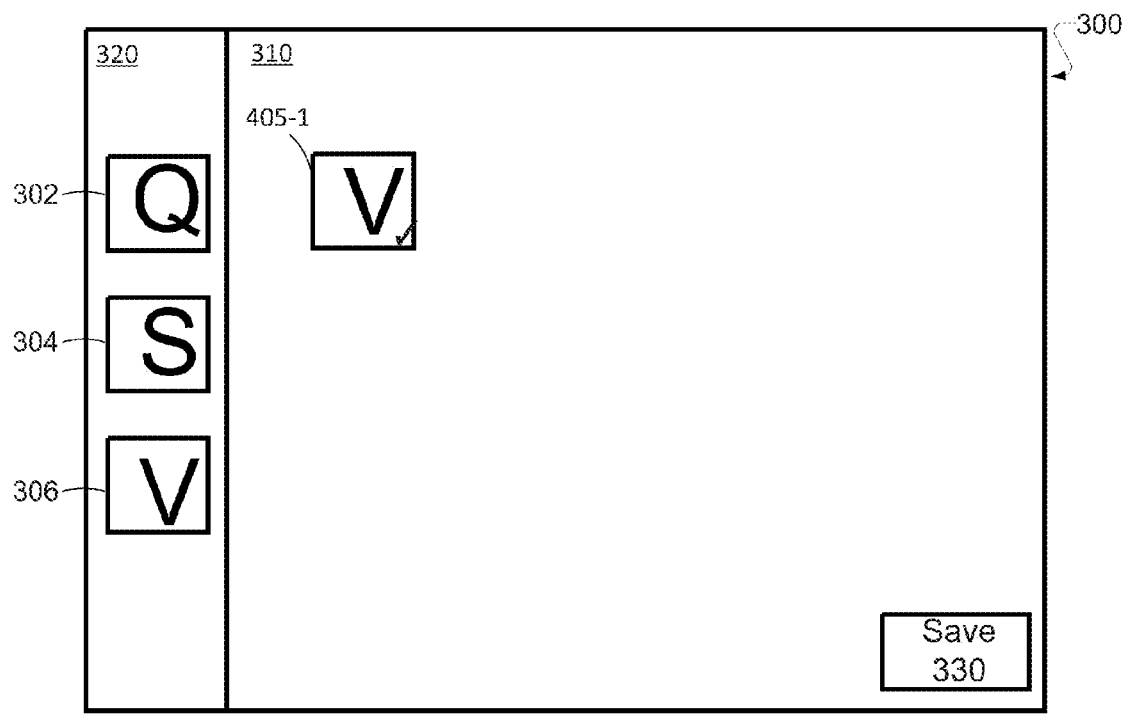
FIG. 5A illustrates an exemplary portion of a user interface window, according to various embodiments.

After the video composer UI records/accesses the video content, the user interface module 202 may associate the recorded video content with the dropped video program icon 405 in the precedence graph area 310. For example, the recorded video content may be stored in a storage area, and the dropped video program icon 405 may be associated with a reference link or pointer to the stored video content. As illustrated in FIG. 5A, after the dropped video program icon 405 is associated with video content, a checkmark or other indicia may be displayed in the dropped video program icon to indicate that icon is now a "P#/C#" icon 405-1, as described below.

According to various exemplary embodiments, once content has been associated with a program icon in the precedence graph area 310, the user interface module 202 characterizes the program icon as a P#/C# icon or P#/C# pair (also referred to as a program-content-pairing icon). A P#/C# icon references particular content created by a particular program. For instance, "P1/C1" indicates that "program 1" (e.g., a particular composer UI) generates "content 1".

Figure 5B:
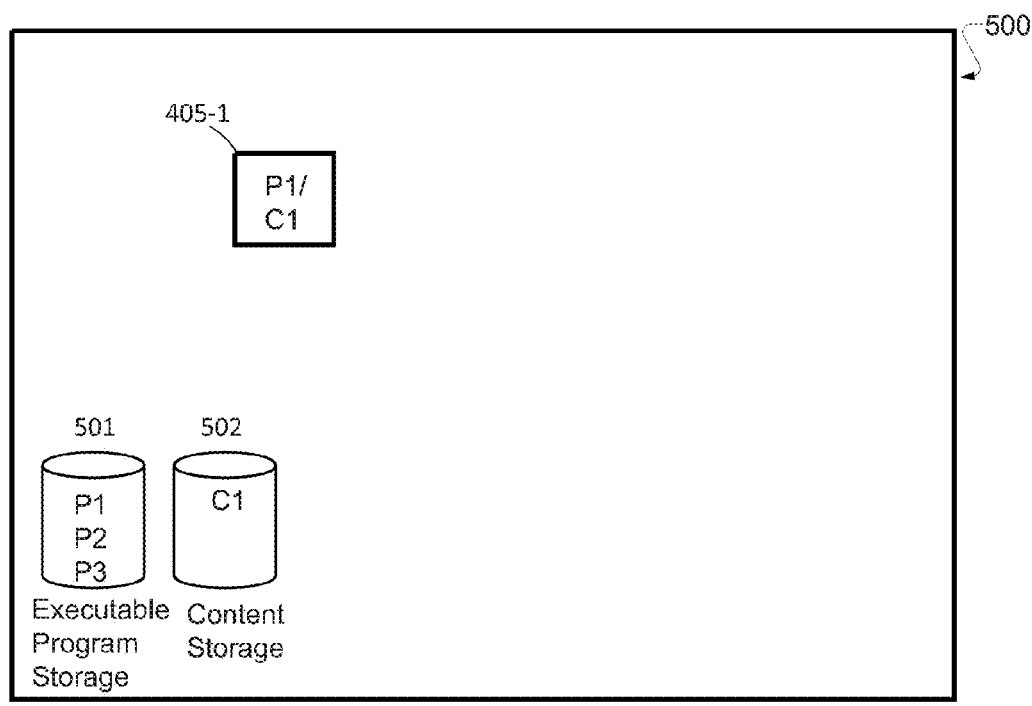
FIG. 5B illustrates an exemplary portion of a user interface window, according to various embodiments.

For example, FIG. 5B illustrates an alternative depiction of the precedence graph area 310. As illustrated in FIG. 5B, precedence graph area 500 includes P#/C# icon "P1/C1" 405-1 (which corresponds to the former video program icon 405 illustrated in FIG. 4A). "P1/C1" indicates that "program 1" (e.g., the video composer UI illustrated in FIG. 4B) generates "content 1" (such as the video illustrated in FIG. 4B). As illustrated in FIG. 5B, an executable program storage 501 stores executable programs P1, P2, P3 which may correspond to a video composer UI/module, sketch composer UI/module, and quiz composer UI/module, as described in this disclosure. Further, content storage 502 stores content created by these executable programs, including the aforementioned content "C1" (e.g., the video illustrated in FIG. 4B) generated by the program "P1" (e.g., the video composer UI illustrated in FIG. 4B), where this content is referenced by the P1/C1 icon 405-1.

Figure 6A:
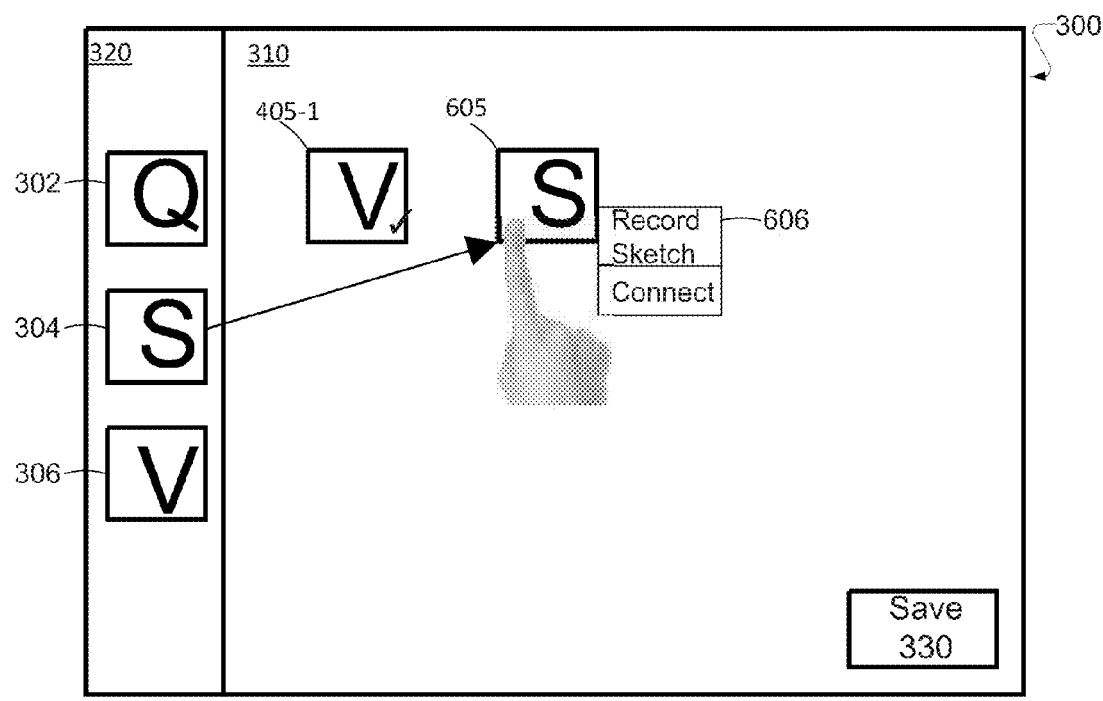
FIG. 6A illustrates an exemplary portion of a user interface window, according to various embodiments.

Turning now to FIG. 6A, another example is illustrated. The user moves the sketch program icon 304 to the precedence graph area 310 resulting in moved sketch program icon 605, and the sketch program icon 605 or the user interface module 202 calls/launches the sketch composer UI referenced by the sketch program icon 304. When the sketch program icon 304 is moved to the precedence graph area 310, a pop-up user interface element 606 with a "Record Sketch" button may be displayed for user selection (see FIG. 6A), thereby initiating the sketch composer UI upon selection of the "Record Sketch" button in pop-up user interface element 606.

Figure 6B:
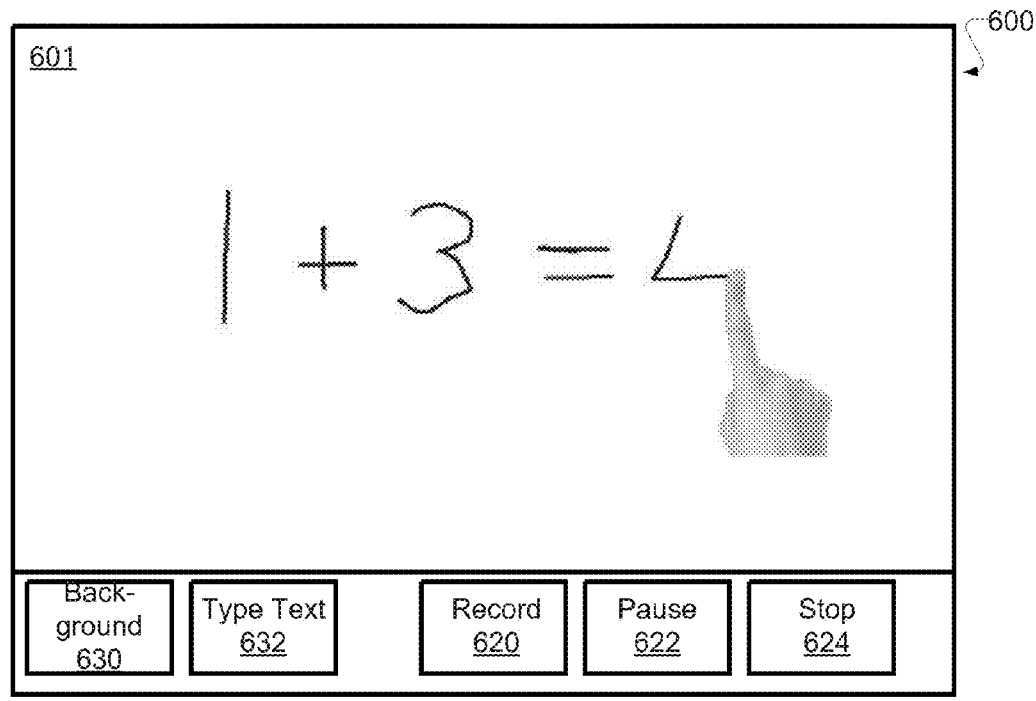
FIG. 6B illustrates an exemplary portion of a user interface window, according to various embodiments.

As described throughout this disclosure, a sketch or sketch video refers to any drawing or writing received directly based on user input, such as input from the finger of the user or an object (e.g., stylus) received via a touchscreen of the smart phone. Thus, the sketch may be similar to a freehand drawing in a sketch pad or scratchpad. For example, FIG. 6B illustrates an exemplary portion of a sketch composer UI 600. The sketch composer UI 600 includes sketch window 601, as well as a record button 620, pause button 622, and stop button 624. When the user selects the record button 620, any input received by the user is recorded in real-time as a video input with sound. For example, as illustrated in FIG. 6B, the user is creating markings on the touch screen of a tablet computing device, which is being recorded as a video with sound (and when the video is displayed, the user will be able to see the continuous drawing of the markings). If the user selects the pause button 622, then the user may continue to draw in the sketch area 601, and when the user selects the pause button 622 again, the sketch video and sound recording will continue with the new user inputs already in place. For example, if an instructor needs to draw a fairly complex diagram and does not want the sketch video recording to capture the downtime while the instructor is drawing the complex diagram, the user may select the pause button 622 and draw the complete diagram, with the user inputs being reflected as markings in the sketch window 601. When the user selects the pause button 622 again, the recording of the sketch video is resumed with the fully drawn diagram being displayed. Thus, when a viewer is viewing the sketch video at a later time, it will appear to the viewer that at one moment there does not appear to be any diagram, and at the next moment the diagram appears in the sketch video.

If the user selects the stop button 624, the recording the sketch video is stopped, and moreover, any user input received via the touchscreen of the client device is not registered or displayed sketch window 601. The user interface 600 of the sketch recorder application also includes a load background button 630. When the user selects the load background button 630, the user may select a background picture, image, file, slideshow slide, etc. from the user's directory of files for display as a background in the sketch area 601 (and in the resulting sketch video). In this way, the user is able to create a sketch video where they circle portions of images, underline portions of documents, and the like. If the user selects the type text button 632, a keyboard may be displayed by the precedence graph module 204; the user may select a given position of the sketch area 601, and then any user input via the displayed keyboard may be displayed as typed characters or text at the given position.

Figure 7A:
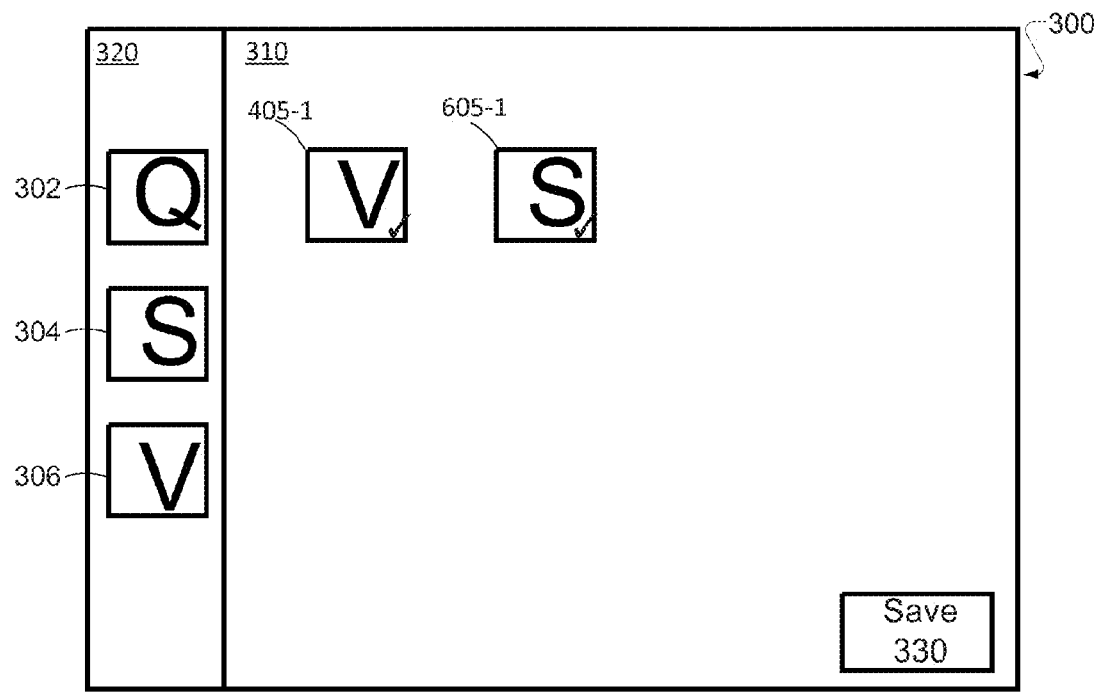
FIG. 7A illustrates an exemplary portion of a user interface window, according to various embodiments.

After the sketch composer UI records the sketch content, the user interface module 202 may associate the recorded sketch content with the dropped sketch program icon 605 in the precedence graph area 310. For example, the recorded sketch content may be stored in a storage area, and the dropped sketch program icon 605 may be associated with a reference link or pointer to the stored sketch content. As illustrated in FIG. 7A, after the dropped sketch program icon 605 is associated with sketch content, a checkmark or other indicia may be displayed in the dropped sketch program icon to indicate that icon is now a "P#/C#" icon 605-1, as described below.

That is, as described in various exemplary embodiments above, once content has been associated with a program icon in the precedence graph area 310, the user interface module 202 characterizes the program icon as a P#/C# icon or P#/C# pair (also referred to as a program-content-pairing icon). A P#/C# icon references particular content created by a particular program. For instance, "P1/C1" indicates that "program 1" (e.g., a composer UI) generates "content 1".

Figure 7B:
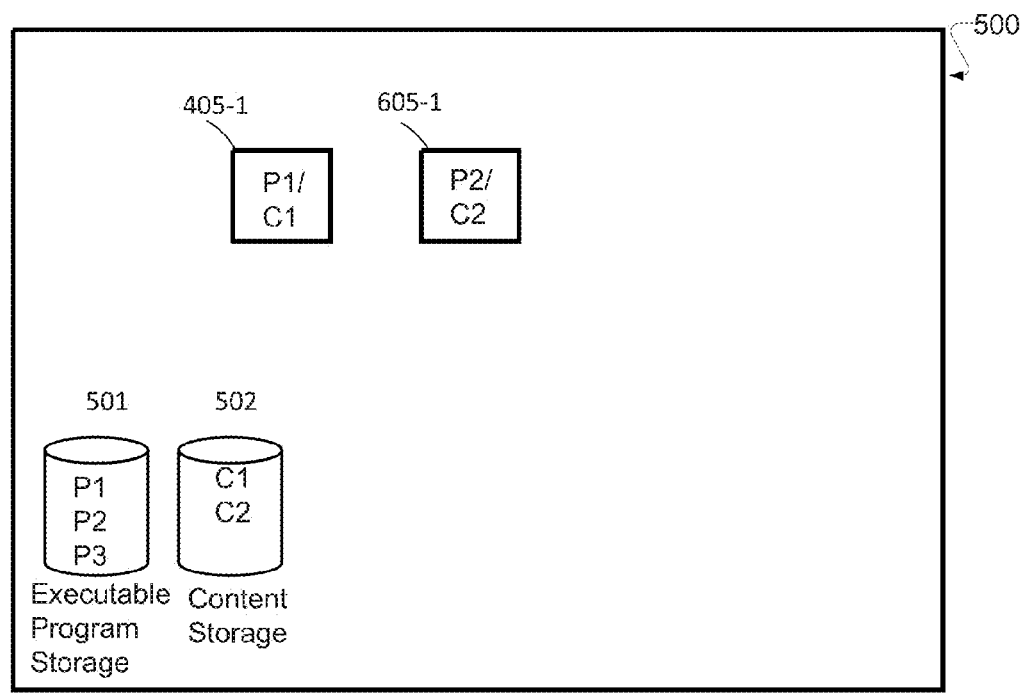
FIG. 7B illustrates an exemplary portion of a user interface window, according to various embodiments.

For example, FIG. 7B illustrates an alternative depiction of the precedence graph area 310. As illustrated in FIG. 7B, precedence graph area 500 includes P#/C# icon "P1/C1" 405-1 (which corresponds to the former video program icon 405 illustrated in FIG. 4A) and P#/C# icon "P2/C2" 605-1 (which corresponds to the former sketch program icon 605 illustrated in FIG. 6A). "P2/C2" indicates that "program 2" (e.g., the sketch composer UI illustrated in FIG. 6B) generates "content 2" (such as the sketch video illustrated in FIG. 6B). As illustrated in FIG. 7B, an executable program storage 501 stores executable programs P1, P2, P3 which may correspond to the video composer UI, sketch composer UI, and quiz composer UI described in this disclosure. Further, content storage 502 stores content created by these executable programs, including the aforementioned content "C2" (e.g., the sketch illustrated in FIG. 6B) generated by the program "P2" (e.g., the sketch composer UI illustrated in FIG. 6B), which is referenced by the P2/C2 icon 605-1. Thus, according to various exemplary embodiments, the user interface module 202 is configured to associate content with each of the program icons in the precedence graph area 310, and to then re-characterize these program icons as P#/C# icons.

Operations of the precedence graph module 204 are now discussed. According to various embodiments, the precedence graph module 204 is configured to detect user interaction with the plurality of P#/C# icons in the precedence graph area 310. In particular, the user interaction may correspond to specifying an ordering of the plurality of P#/C# icons, when the user draws lines between the P#/C# icons or changes the arrangement of the P#/C# icons. Thereafter, the precedence graph module 204 is configured to generate a program flow precedence graph, based on the P#/C# icons in the precedence graph area 310 and the ordering of the P#/C# icons specified by the user. The precedence graph module 204 may generate the precedence graph by placing arrow connectors between the P#/C# icons that reflect the ordering specified by the user.

Figure 8A:
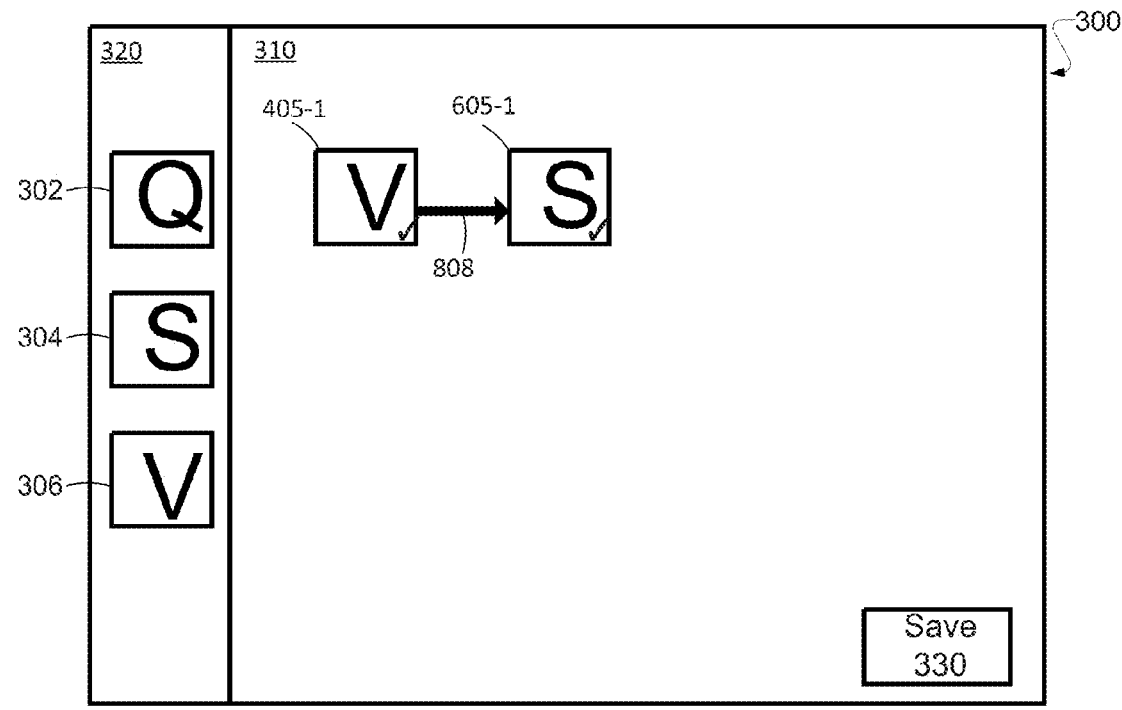
FIG. 8A illustrates an exemplary portion of a user interface window, according to various embodiments.

For example, as illustrated in FIG. 7A, precedence graph area 310 includes the P1/C1 icon 405-1 and the P2/C2 icon 605-1, and FIG. 8A illustrates that an arrow connector 808 has been inserted between P1/C1 icon 405-1 and P2/C2 icon 605-1, the arrow extending from P1/C1 icon 405-1 to P2/C2 icon 605-1. As described in more detail below, the arrow connector 808 indicates that content associated with the P2/C2 icon 605-1 is to be displayed after display of content associated with the P1/C1 icon 405-1, during execution of an interactive program.

The precedence graph module 204 may generate an arrow connector such as the arrow connector 808 in various ways. According to an aspect, the precedence graph module 204 may generate the arrow connector extending from a first icon to a second icon (such as arrow connector 808 illustrated in FIG. 8A), after the user draws a line extending from a first icon to a second icon (e.g., on a touch screen of a tablet device). According to another aspect, the precedence graph module 204 may generate the arrow connector after the user selects a "Connect" user interface element. For example, with reference to FIG. 6A, after the user drags the icon 304 into the precedence graph area 310, pop-up user interface element 606 automatically appears, and if the user selects the "Connect" option, the user is able to select a first icon (e.g., icon 405 illustrated in FIG. 6A) and a second icon (e.g., icon 605 illustrated in FIG. 6A), and then the precedence graph module 204 will automatically generate and display the arrow connector extending from the first icon to the second icon (e.g., arrow connector 808 illustrated in FIG. 8A).

According to another aspect, the precedence graph module 204 may generate the arrow connector automatically based on the user specification of the arrangement of the icons in the precedence graph area 310. For example, as illustrated in FIG. 7A, the user may manipulate the arrangement of the P#/C# icons 405-1, 605-1 so as to adjust the relative positions of the P#/C# icons 405-1, 605-1, so that one icon appears to the left of the other icon. The precedence graph module 204 may determine that if a second icon is dropped within a predetermined distance of a first icon dropped in the precedence graph area 310, and/or the second icon is positioned in a particular direction with respect to the first icon (e.g., the second icon is to the right of the first icon), then an arrow connector extending from the first icon to the second icon should be generated and displayed. For example, with reference to FIG. 8A, the aforementioned first icon may correspond to the P1/C1 icon 405-1 and the aforementioned second icon may correspond to the P2/C2 icon 605-1.

Thus, an ordering of the P#/C# icons may be specified by the user, and the ordering may be indicated by one or more arrow connector's between the P#/C# icons in a precedence graph. That is, after the user interacts with the P#/C# icons in the precedence graph area 310 in order to specify an ordering of the P#/C# icons, the precedence graph module 204 is configured to generate the program flow precedence graph, based on the P#/C# icons in the precedence graph area 310 and the ordering of the P#/C# icons in the precedence graph area 310 as specified by the user.

As described throughout this disclosure, a program flow precedence graph references a program flow of an interactive program. In other words, a program flow precedence graph depicts a program flow (i.e., a series of steps in a process and the order in which they occur). For example, a program flow precedence graph may illustrate a series of boxes representing units of content and arrows between each of the boxes indicating the order in which each unit of content is to be played. As described above, the precedence graph module 204 may generate and display a series of arrows between each of the P#/C# icons in the precedence graph area 310, to thereby generate and display a program flow precedence graph comprised of the P#/C# icons in the precedence graph area 310 and the generated arrows. This program flow precedence graph generated by the precedence graph module 204 corresponds to a set of instructions for display of various content (e.g., content associated with the P#/C# icons 405-1 and 605-1) to thereby generate an interactive program such as an interactive video.

Figure 8B:
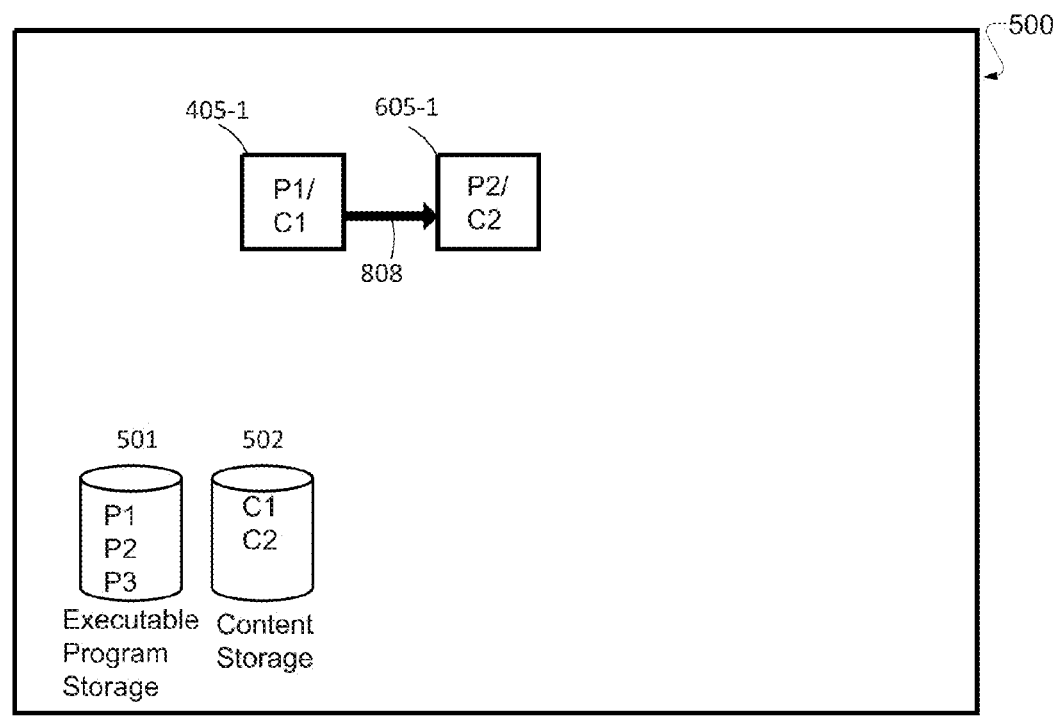
FIG. 8B illustrates a program flow precedence graph, according to various embodiments.

FIG. 8B illustrates a program flow precedence graph of a program, generated based on the P#/C# icons and arrows illustrated in the precedence graph area 310 of FIG. 8A. That is, the precedence graph module 204 has generated and displayed an arrow connector 808 extending from the P1/C1 icon 405-1 to the P2/C2 icon 605-1, to thereby generate a precedence graph, which is also displayed in FIG. 8B. The precedence graph illustrated in FIG. 8B indicates that the video content associated with the P1/C1 icon 405-1 is played first, and then the sketch content associated with the P2/C2 icon 605-1 is played immediately after the video content, to form a single interactive program.

When the user selects the save button 330 in FIG. 8B, the program flow precedence graph displayed in the precedence graph area 310 is stored as a series of instructions (e.g., in a data file) for selective display of respective portions of the content associated with the P#/C# icons in the program flow precedence graph. That is, when the user accesses the file and initiates display, the video content associated with the P1/C1 icon 405-1 is played first, and then the sketch content associated with the P2/C2 icon 605-1 is played immediately after the video content as a single interactive program. Thus, the precedence graph module 204 or another application is configured to execute the interactive program, based on the program flow referenced by the program flow precedence graph.

Figure 9:
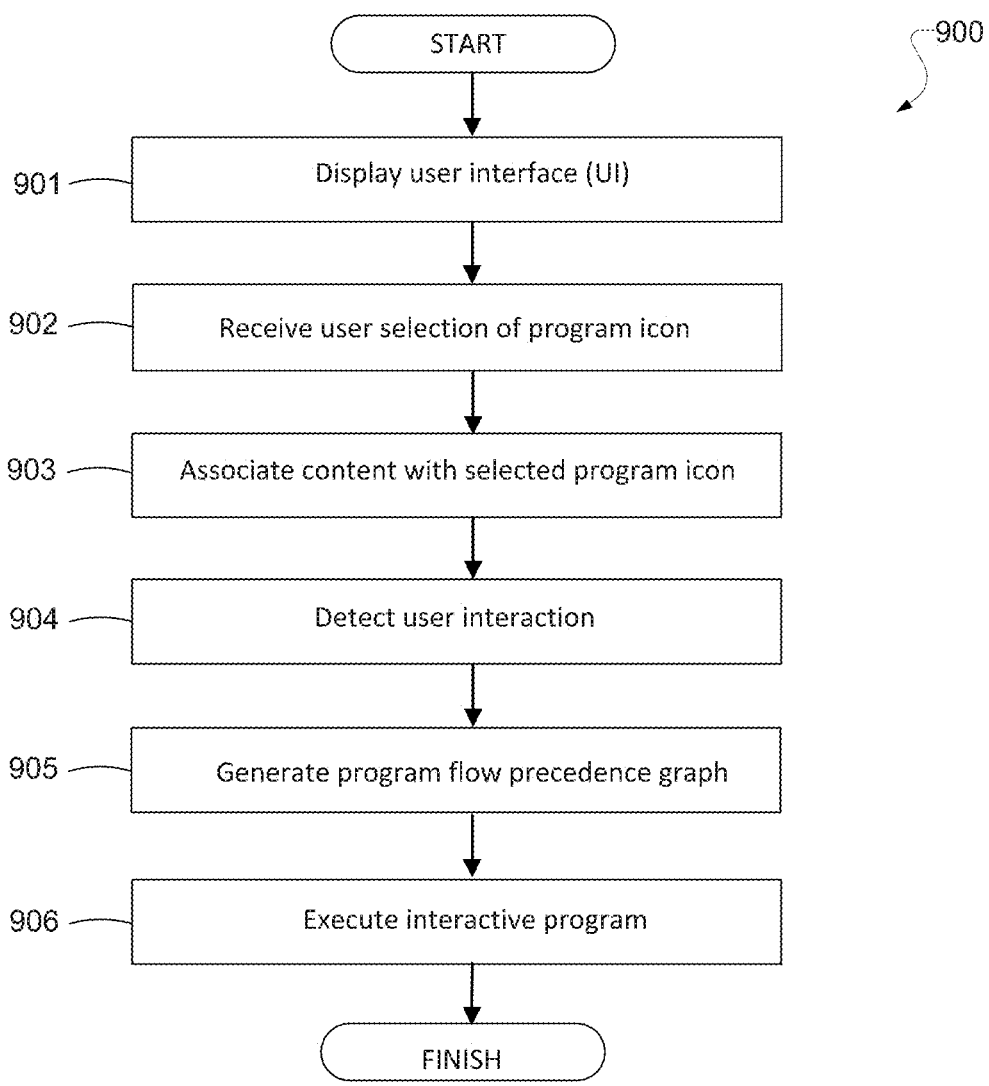
FIG. 9 illustrates an exemplary method, according to various embodiments.

FIG. 9 is a flowchart illustrating an example method 900, according to various embodiments. The method 900 may be performed at least in part by, for example, the interactive content creation system 200 illustrated in FIG. 2 (or an apparatus having similar modules, such as client machines 110 and 112 or application server 112 illustrated in FIG. 1). In 901, the user interface module 202 displays, on a client device, a user interface (UI) including a precedence graph area and an icon list displaying multiple types of program icons (see FIG. 3). In 902, the user interface module 202 receives a user selection of one of the program icons, the user selection corresponding to moving the selected program icon to the precedence graph area, the selected program icon referencing a composer UI to generate content of a specific media type. In 903, the user interface module 202 associates the generated content with the selected program icon, and characterizes the selected program icon as a first program-content-pairing icon that references the content created by the composer UI (see, e.g., FIG. 7A).

In 904, the precedence graph module 204 detects a user interaction with a plurality of program-content-pairing icons in the precedence graph area, the user interaction corresponding to specifying an ordering of the plurality of program-content-pairing icons. For example, as described above, the user may draw an arrow between various program-content-pairing icons, or may manipulate the arrangement of the various program-content-pairing icons. In 905, the precedence graph module 204 generates a program flow precedence graph referencing a program flow of an interactive program, based on the ordering of the program-content-pairing icons in the precedence graph area (see, e.g., FIGS. 8A and 8B). The generation of the program flow precedence graph may include placing arrow connectors between the program-content-paring icons in the precedence graph area. In 906, the precedence graph module 204 executes the interactive program, based on the program flow referenced by the program flow precedence graph generated in 905.

Figure 10:
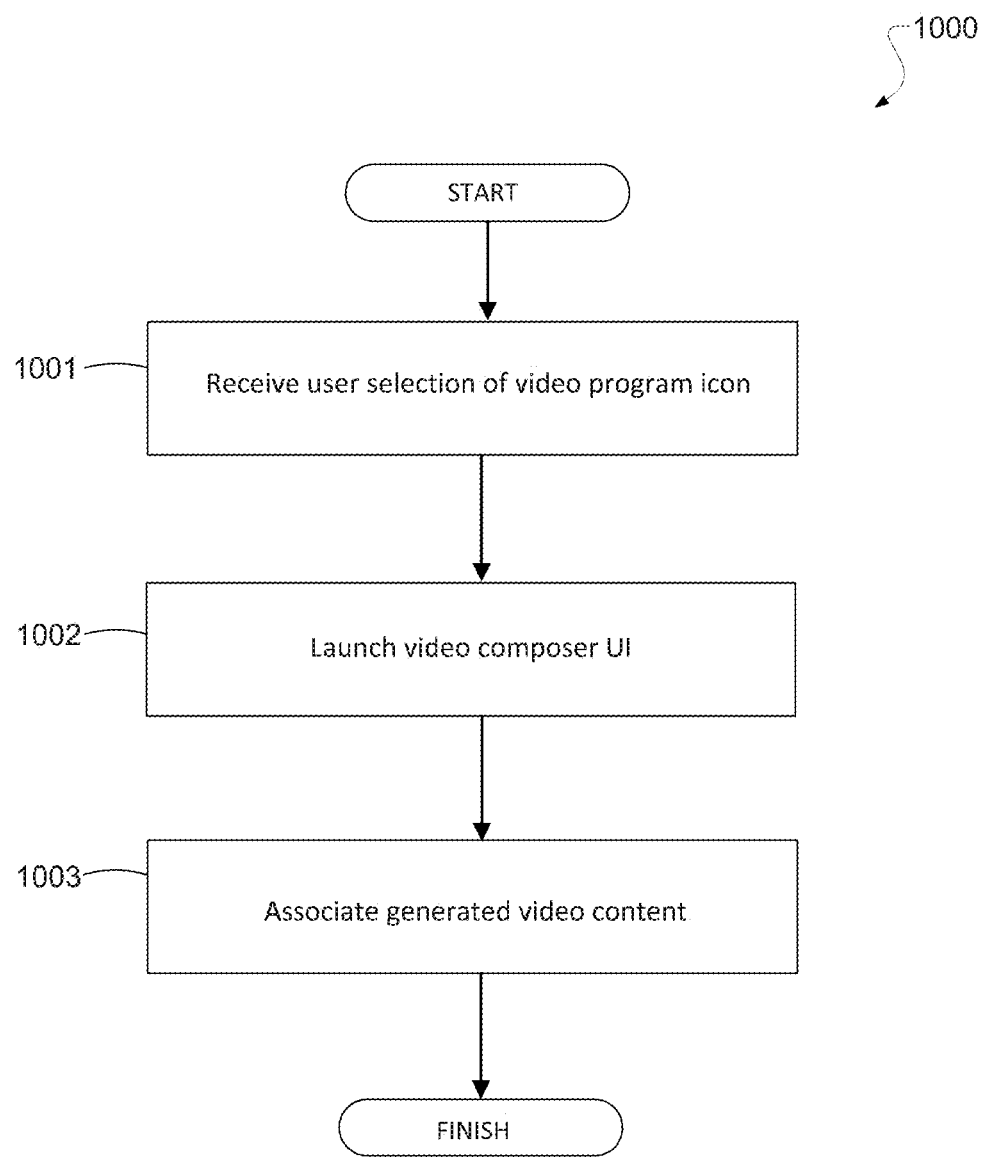
FIG. 10 illustrates an exemplary method, according to various embodiments.

FIG. 10 is a flowchart illustrating an example method 1000, according to various embodiments. The method 1000 may be performed at least in part by, for example, the interactive content creation system 200 illustrated in FIG. 2 (or an apparatus having similar modules, such as client machines 110 and 112 or application server 112 illustrated in FIG. 1). In 1001, the user interface module 202 receives a user selection of a video program icon moved to the precedence graph area. In 1002, a video composer UI configured to record video content is launched. In 1003, the user interface module 202 associates the recorded video content with the video program icon, and characterizes the video program icon as a program-content-pairing icon that references the video content created by the video composer UI.

Figure 11:
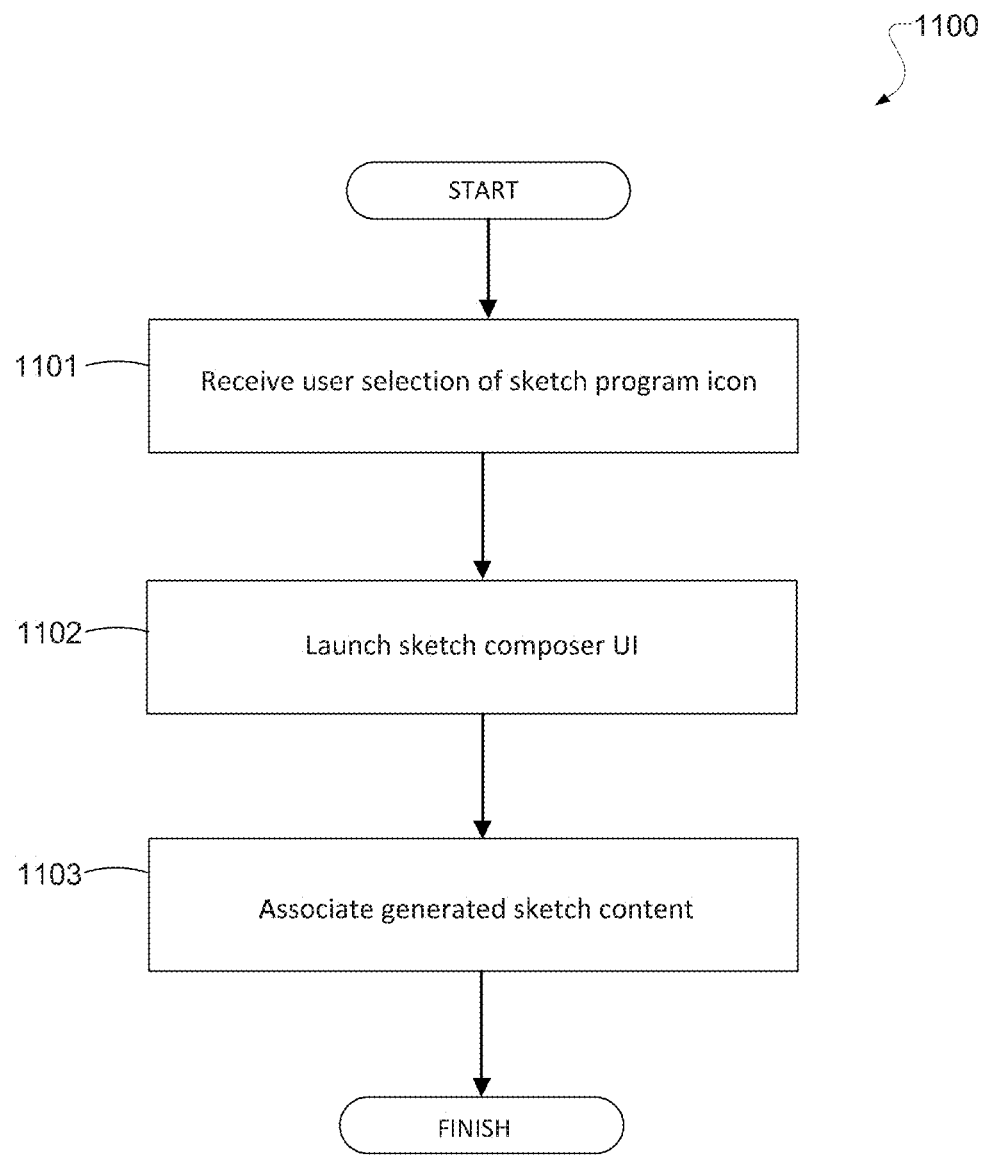
FIG. 11 illustrates an exemplary method, according to various embodiments.

FIG. 11 is a flowchart illustrating an example method 1100, according to various embodiments. The method 1100 may be performed at least in part by, for example, the interactive content creation system 200 illustrated in FIG. 2 (or an apparatus having similar modules, such as client machines 110 and 112 or application server 112 illustrated in FIG. 1). In 1101, the user interface module 202 receives a user selection of a sketch program icon moved to the precedence graph area. In 1102, a sketch composer UI configured to record sketch content is launched. In 1103, the user interface module 202 associates the recorded sketch content with the sketch program icon, and characterizes the sketch program icon as a program-content-pairing icon that references the sketch content created by the sketch composer UI.

Figure 12:
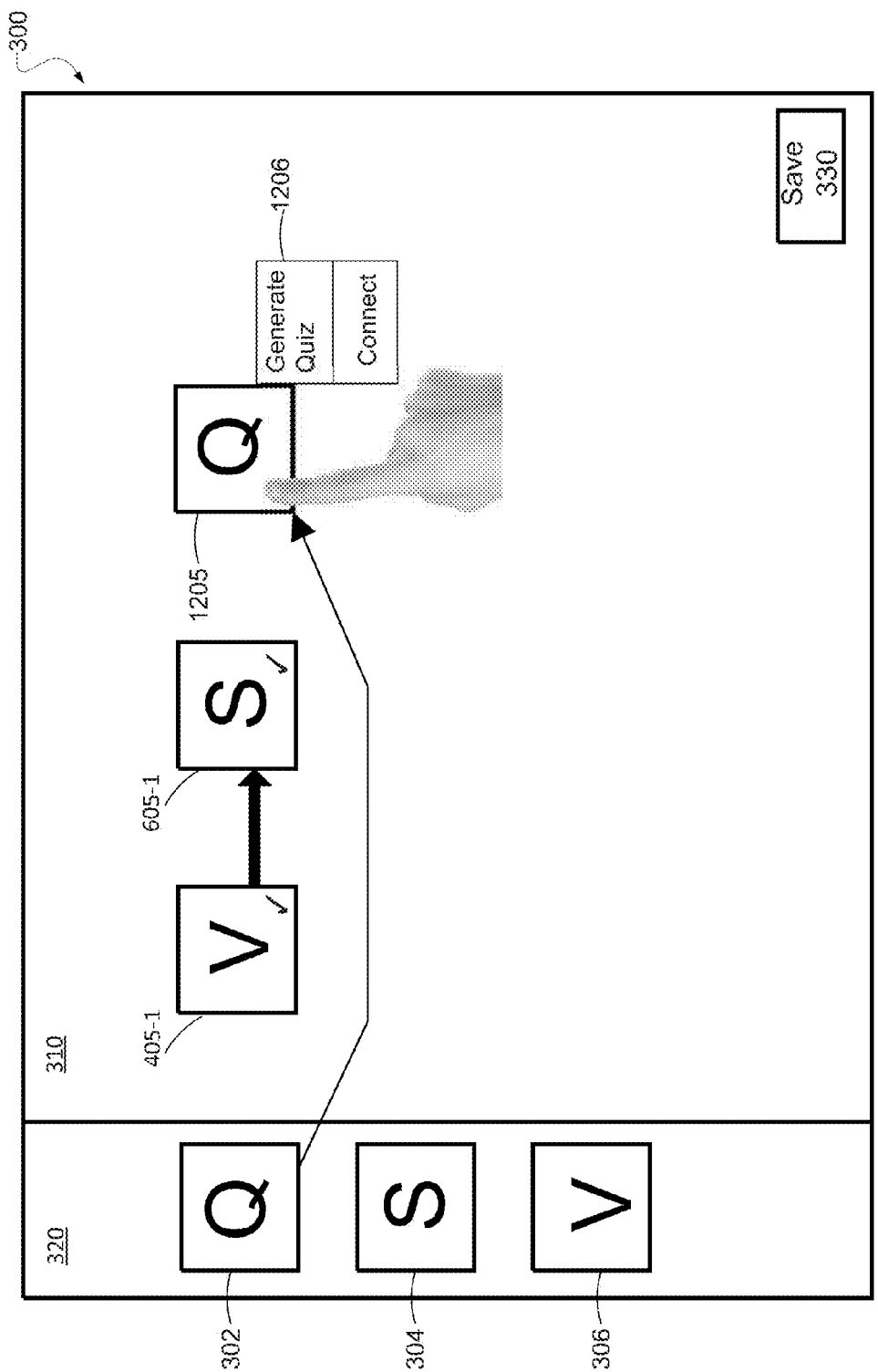
FIG. 12 illustrates an example portion of a user interface window, according to various embodiments.

As described above, the program icons included in the icon list 320 (see FIG. 3) also include a quiz program icon 302. As illustrated in FIG. 12, the user moves the quiz program icon 302 to the precedence graph area 310 resulting in moved quiz program icon 1205, and the quiz program icon 302 or the user interface module 202 calls/launches the quiz composer UI referenced by the quiz program icon 302. The quiz composer UI may be configured to generate quiz content (such as quizzes, exercises, or tests). When the quiz program icon 302 is dropped in the precedence graph area 310, a pop-up user interface element 1206 with a "Generate Quiz" button may be displayed for user selection (see FIG. 12), thereby initiating the quiz composer UI upon selection of the "Generate Quiz" button in pop-up user interface element 1206.

Figure 13A:
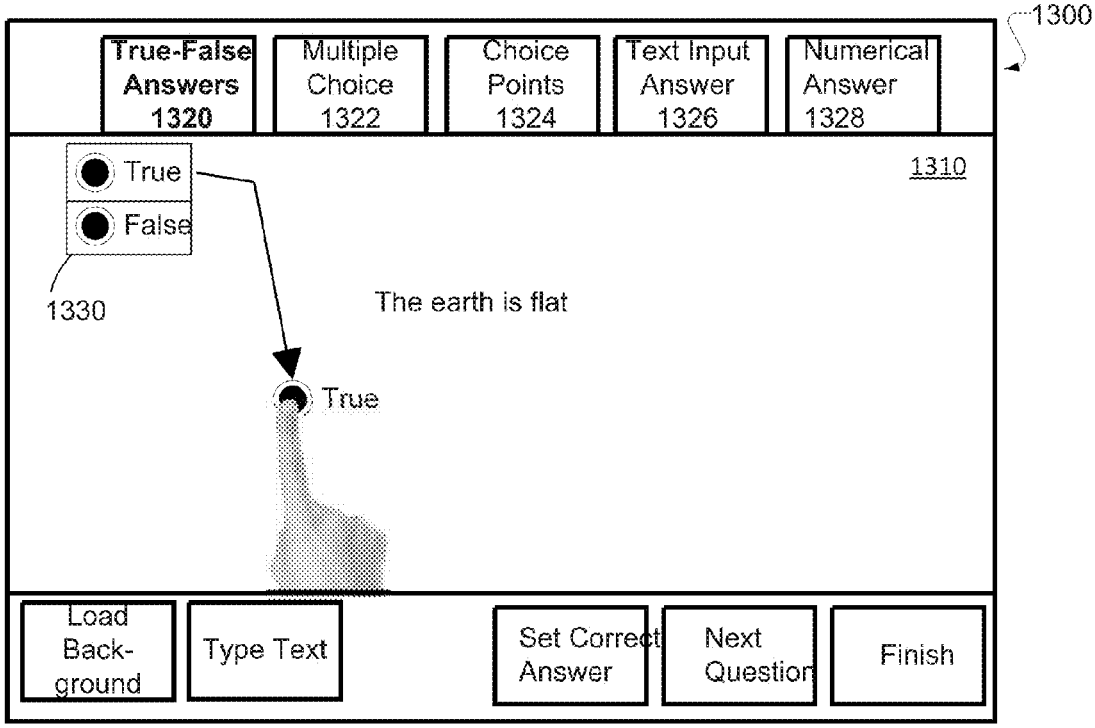
FIG. 13A illustrates an exemplary portion of a user interface window, according to various embodiments.

FIG. 13A illustrates an exemplary portion of a quiz composer UI 1300. The quiz composer UI 1300 includes a composition area 1310 (similar to the sketch area 601 of FIG. 6) where the user can provide input by writing quiz questions by hand, or the user can select the type text button and select a portion of the composition area 1310, and then enter text for the questions of the quiz via a keyboard displayed by the precedence graph module 204. As seen in FIG. 13A, the user has already entered the text of "The earth is flat" as a true-false quiz question. When the user selects the true false answers selection button 1320, the pop-up user interface element 1330 appears with sample participant response icons, such as a "true" participant response icon and a "false" participant response icon. As illustrated in FIG. 13A, the user may drag and drop the sample participant response icons from the pop-up menu 1330 to a desired position in the composition area 1310. Thus, the user is able to generate an interactive quiz, where quiz participants can view the quiz question, and are provided with a number of selection buttons to enter their response.

Figure 13B:
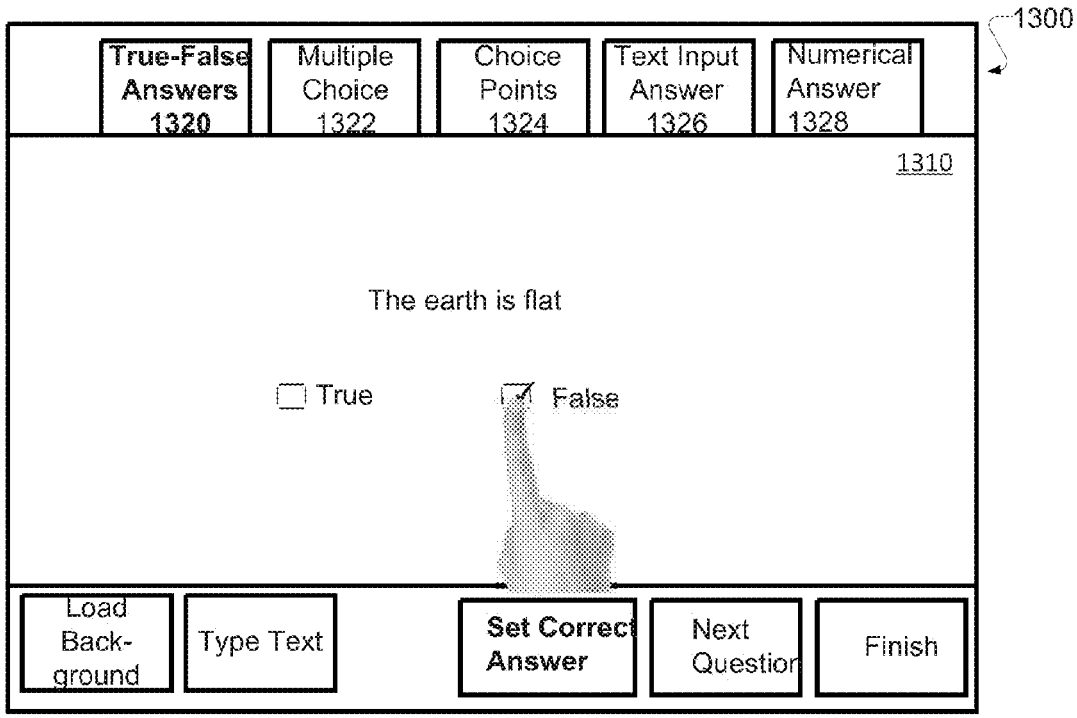
FIG. 13B illustrates an exemplary portion of a user interface window, according to various embodiments.

Moreover, the quiz composer UI permits the user to set the correct answer for each quiz question. For example, as illustrated in FIG. 13B, after the user has placed the true and false participant response icons in the desired positions, the user may select the set correct answer button, which displays a selection rectangle over each possible participant response icon. As illustrated in FIG. 13B, when the user selects one of the selection rectangles, a checkmark appears to indicate that this is stored by the quiz composer UI as the correct answer to the current quiz question. Thus, the quiz composer UI is able to understand what the correct answer for the question is, so that when a participant takes the quiz, the quiz composer UI may determine whether the participants answered the quiz question correctly or incorrectly. When the user selects the next question button, the user is able to enter another quiz question, as illustrated in FIG. 14A.

Figure 14A:
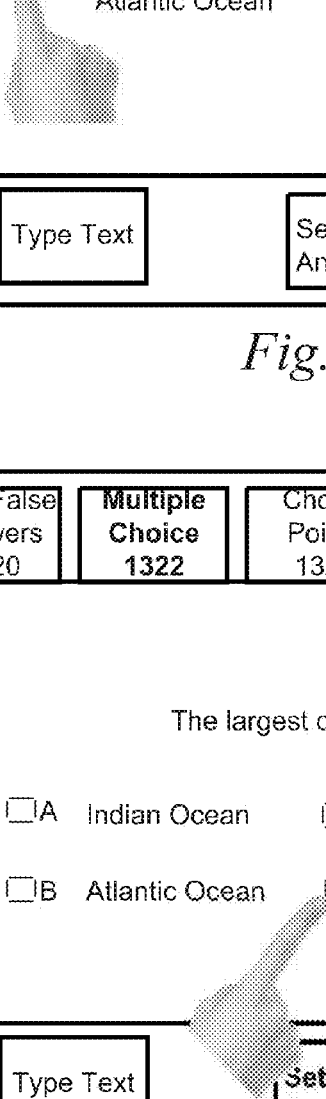
FIG. 14A illustrates an exemplary portion of a user interface window, according to various embodiments.

In FIG. 14A, suppose the user has already entered the text of "The largest ocean is:" and a number of responses such as "Indian ocean", "Atlantic Ocean", etc. When the user selects the multiple-choice answers selection button 1322, the pop-up user interface element 1430 appears with sample participant response icons, such as a "A", "B", "C" and "D" multiple-choice participant response icons. As illustrated in FIG. 14A, the user may drag and drop the sample participant response icons from the pop-up menu 1430 to a desired position in the composition area 1310. Thus, the user is able to generate an interactive quiz, where quiz participants can view the quiz question and are provided with a number of multiple-choice selection buttons to enter their response. Note that instead of the user entering in the answers before dragging the multiple-choice icons into the composition area 1310, once the user drags and drops a participant response icon in the composition area 1310, a text box may be displayed proximate to the dropped participant response icon to allow the user to enter text or freehand writing for the multiple-choice answer.

Figure 14B:
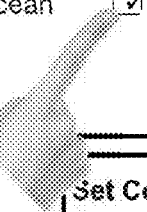
FIG. 14B illustrates an exemplary portion of a user interface window, according to various embodiments.

Moreover, the quiz composer UI permits the user to set the correct answer for each multiple-choice quiz question. For example, as illustrated in FIG. 14B, after the user has placed the multiple-choice participant response icons in the desired positions, the user may select the set correct answer button, which displays a selection rectangle over each possible multiple-choice participant response icon. As illustrated in FIG. 14B, when the user selects one of the selection rectangles, a checkmark appears to indicate that this is stored by the quiz composer UI as the correct answer to the current multiple-choice quiz question. Thus, the quiz composer UI is able to understand what the correct answer for the question is, so that when a participant takes the quiz, the quiz composer UI may determine whether the participants answered the quiz question correctly or incorrectly. When the user selects the next question button, the user is able to enter another quiz question, as illustrated in FIG. 15A.

Figure 15A:
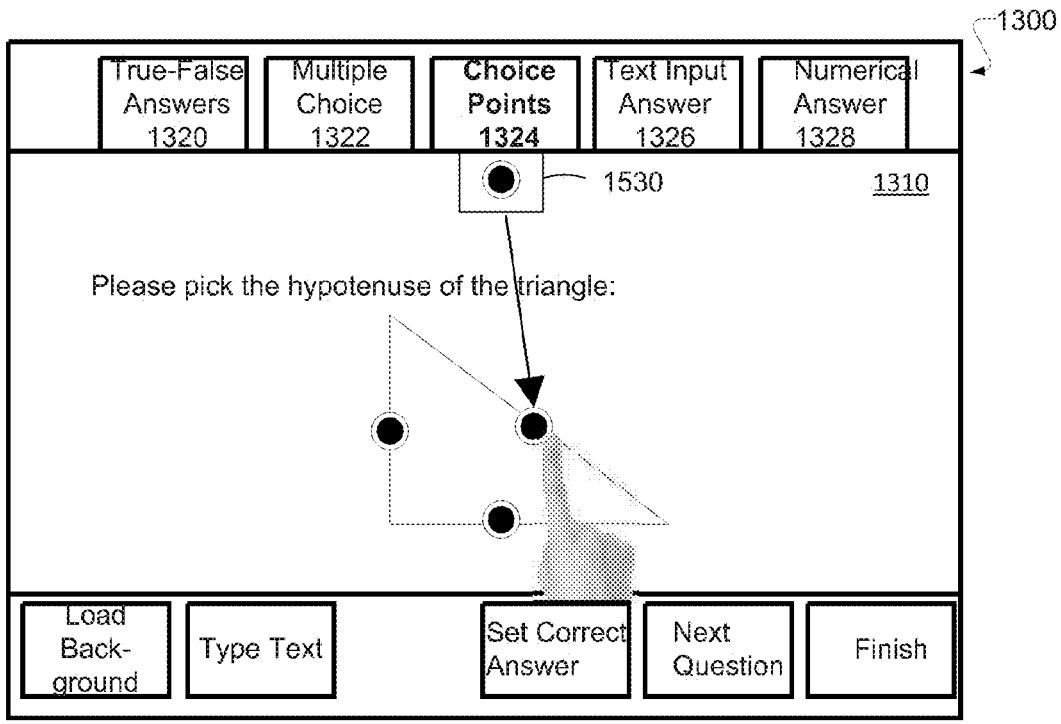
FIG. 15A illustrates an exemplary portion of a user interface window, according to various embodiments.

In FIG. 15A, suppose the user has already entered the text of "Please pick the hypotenuse of the triangle:" and has drawn the triangle (e.g., by using a drawing application or by pressing the load background button to load a file with a picture of a triangle). When the user selects the choice point's answer selection button 1324, the pop-up user interface element 1530 appears with a sample participant response icon. As illustrated in FIG. 15A, the user may drag and drop an arbitrary number of the sample participant response icons from the pop-up menu 1530 to desired positions in the composition area 1310. Thus, the user is able to generate an interactive quiz, where quiz participants can view the quiz question and are provided with a number of choice point selection buttons to enter their response.

Figure 15B:
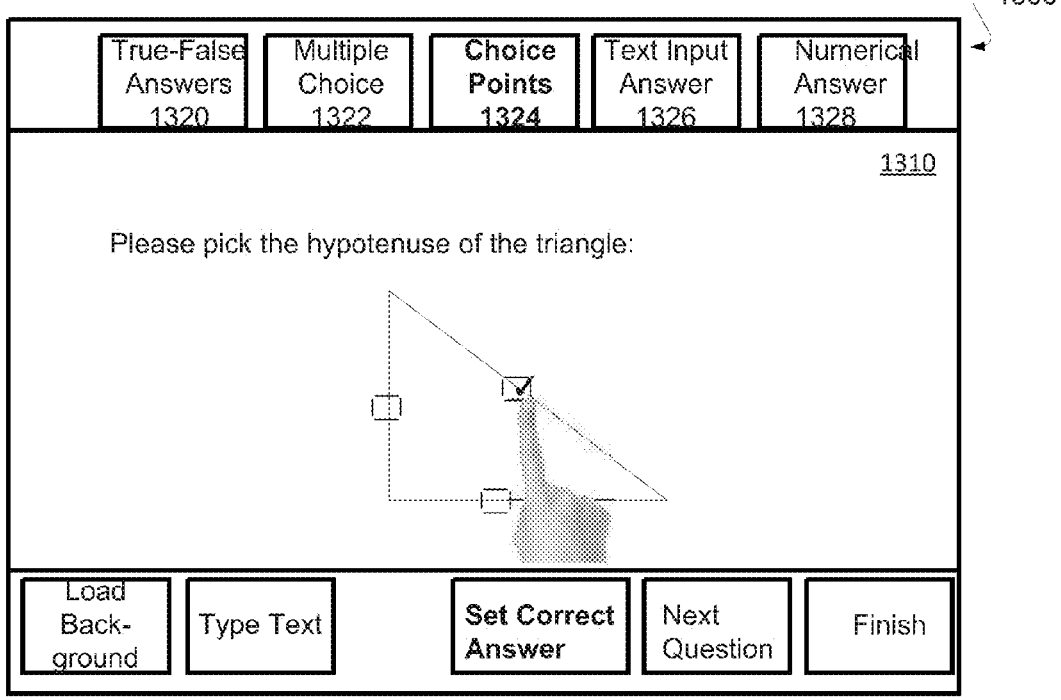
FIG. 15B illustrates an exemplary portion of a user interface window, according to various embodiments.

Moreover, the quiz composer UI permits the user to set the correct answer for each choice point quiz question. For example, as illustrated in FIG. 15B, after the user has placed the choice point participant response icons in the desired positions, the user may select the set correct answer button, which displays a selection rectangle over each possible choice point participant response icon. As illustrated in FIG. 15B, when the user selects one of the selection rectangles, a checkmark appears to indicate that this is stored by the quiz composer UI as the correct answer to the current choice point quiz question. Thus, the quiz composer UI is able to understand what the correct answer for the question is, so that when a participant takes the quiz, the quiz composer UI may determine whether the participants answered the quiz question correctly or incorrectly. When the user selects the next question button, the user is able to enter another quiz question, as illustrated in FIG. 16A.

Figure 16A:
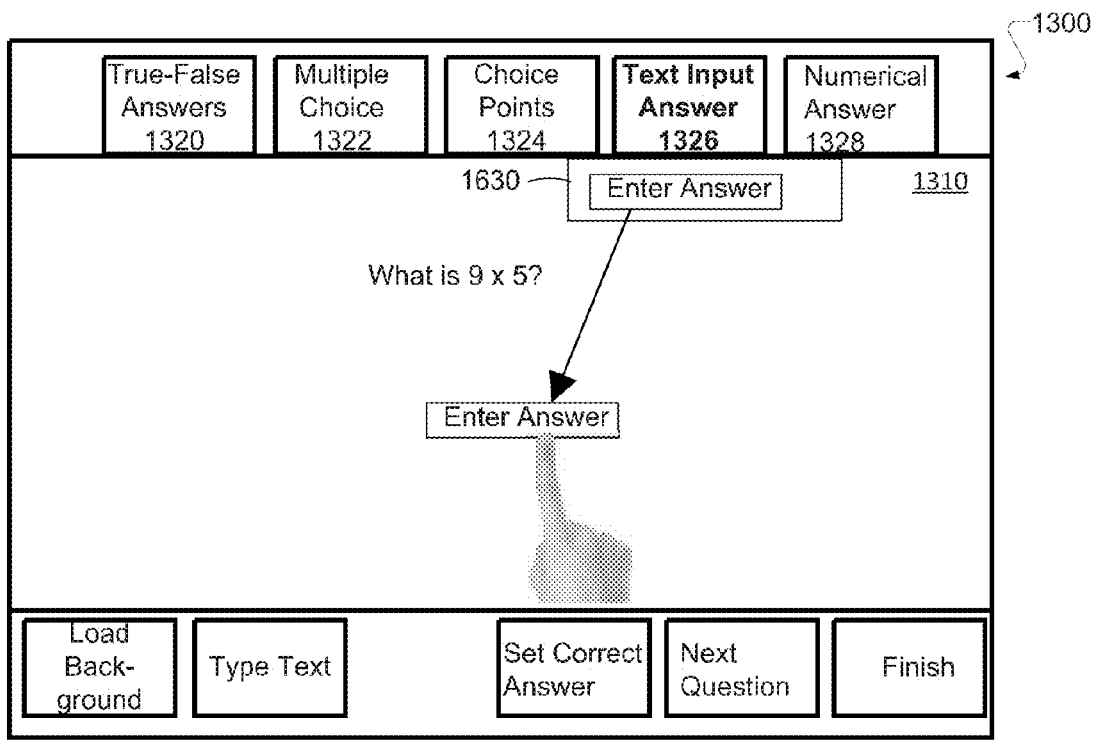
FIG. 16A illustrates an exemplary portion of a user interface window, according to various embodiments.

In FIG. 16A, suppose the user has already entered the text of "What is 9×5?". When the user selects the text input answer selection button 1326, the pop-up user interface element 1630 appears with a sample participant response text entry box. As illustrated in FIG. 16A, the user may drag and drop the sample participant response text entry box from the pop-up menu 1630 to a desired position in the composition area 1310. Thus, the user is able to generate an interactive quiz, where quiz participants can view the quiz question and are provided with a text entry box to enter their response.

Figure 16B:
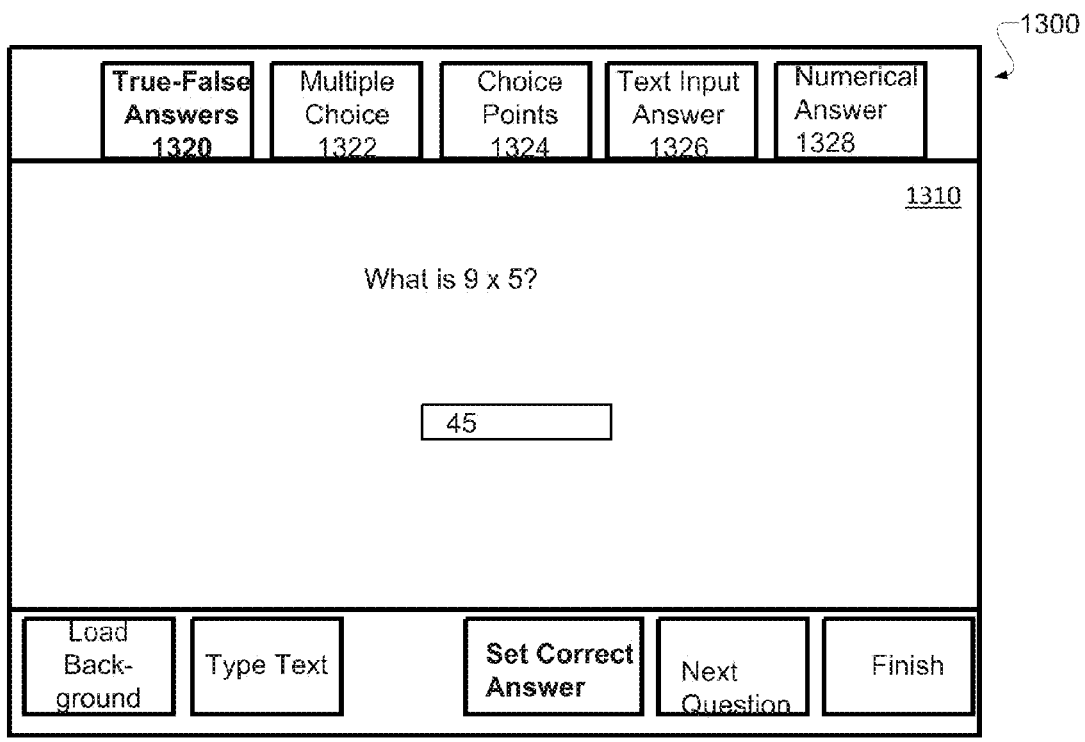
FIG. 16B illustrates an exemplary portion of a user interface window, according to various embodiments.

Moreover, the quiz composer UI permits the user to set the correct answer for each text entry question. For example, as illustrated in FIG. 16B, after the user has placed the sample participant response text entry box in the desired position, the user may select the set correct answer button, which displays a selection rectangle over the candidate participant response text entry box. As illustrated in FIG. 16B, when the user selects the selection rectangle, the user may enter the correct answer to the current text entry quiz question. Thus, the quiz composer UI is able to understand what the correct answer for the question is, so that when a participant takes the quiz, the quiz composer UI may determine whether the participants answered the quiz question correctly or incorrectly. The numerical answer selection button 1328 functions similarly to the text input answer selection button 1326 just described, and will not be discussed in further detail in the interest of clarity. It is apparent that the functions performed by the quiz composer you buy may be performed by a quiz composer module.

Figure 17A:
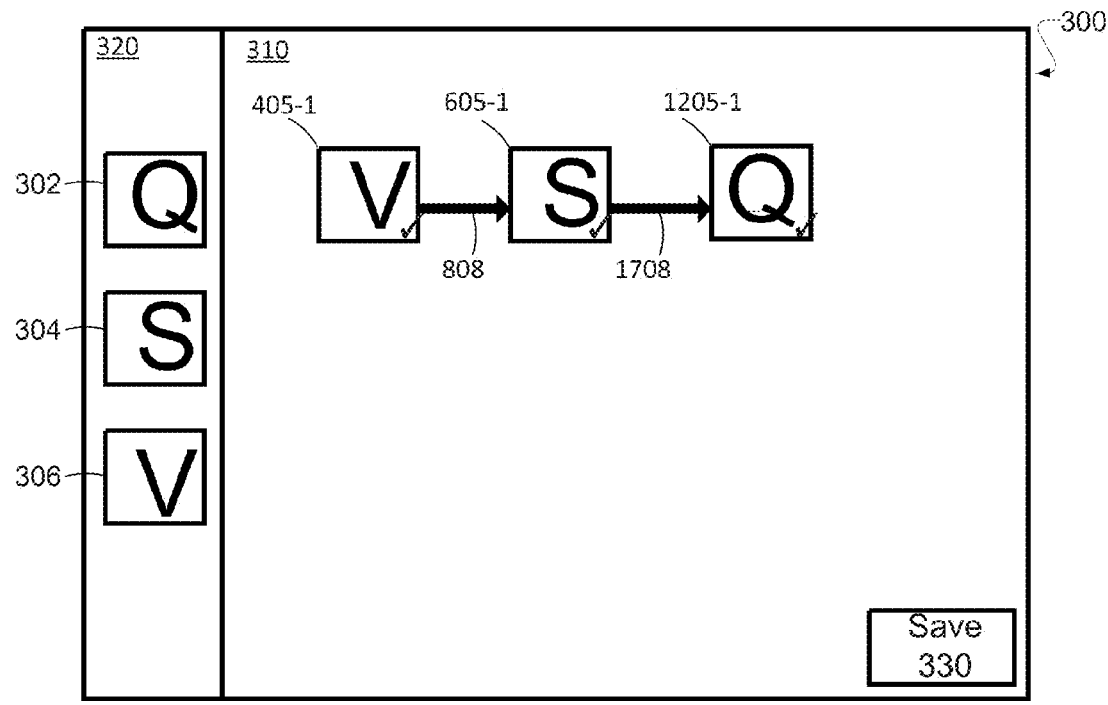
FIG. 17A illustrates an exemplary portion of a user interface window, according to various embodiments.

When the user selects the finish button illustrated in FIG. 16B, then as illustrated in FIG. 17A the quiz content generated by the user (which may include multiple quiz questions) is associated with the quiz program icon 1205 dropped in the precedence graph area 310. For example, the recorded quiz content may be stored in a storage area, and the dropped quiz program icon 1205 may be associated with a reference link or pointer to the stored quiz content. As illustrated in FIG. 17A, after the dropped quiz program icon 1205 is associated with quiz content, a checkmark or other indicia may be displayed in the dropped quiz program icon to indicate that icon is now a P#/C# icon 1205-1.

That is, as described above, according to various exemplary embodiments, once content has been associated with a program icon in the precedence graph area 310, the user interface module 202 re-characterizes the program icon as a P#/C# icon or P#/C# pair (also referred to as a program-content-pairing icon). A P#/C# icon references particular content created by a particular program or composer UI. For instance, "P1/C1" indicates that "program 1" (e.g., a composer UI) generates "content 1".

Figure 17B:
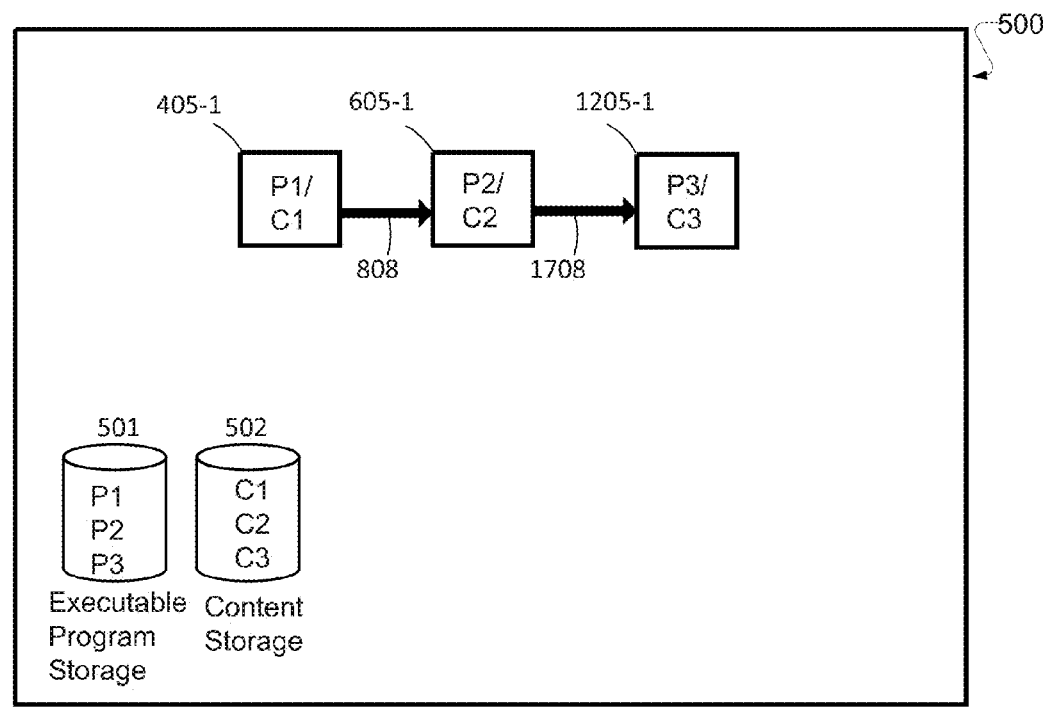
FIG. 17B illustrates a program flow precedence graph, according to various embodiments.

For example, FIG. 17B illustrates an alternative depiction of the precedence graph area 310. As illustrated in FIG. 17B, precedence graph area 500 includes P#/C# icon "P3/C3" 1205-1 (which corresponds to the former quiz program icon 1205 illustrated in FIG. 12). "P3/C3" indicates that "program 3" (e.g., the quiz composer UI illustrated in FIG. 13A) generates "content 3" (such as the quiz illustrated in FIGS. 13A through 16B). As illustrated in FIG. 17B, an executable program storage 501 stores executable programs P1, P2, P3 which may correspond to the video composer UI/module, sketch composer UI/module, and quiz composer UI/module described in this disclosure. Further, content storage 502 stores content created by these executable programs, including the aforementioned content "C3" (e.g., the quiz illustrated in FIGS. 13A through 16B) generated by the program "P3" (e.g., the quiz composer UI illustrated in FIG. 13A), which is referenced by the P3/C3 icon 1205-1.

Moreover, the precedence graph module 204 has generated an arrow 1708 between P2/C2 icon 605-1 and P3/C3 icon 1205-1, in order to generate a program flow precedence graph. The arrow 1708 may have been generated based on user interaction with the P#/C# icons in the precedence graph area 310 (i.e., a user specification of an ordering of the P#/C# icons), based on methods discussed elsewhere in this disclosure. The program flow precedence graph illustrated in FIG. 17B indicates that the video content associated with the P1/C1 icon 405-1 is played first, then the sketch content associated with the P2/C2 icon 605-1 is displayed immediately thereafter, and then the quiz content associated with the P3/C3 icon 1205-1 is displayed, as a single interactive program. Of course, it is apparent that the arrangement of the P#/C# icons and the corresponding program flow precedence graph is completely customizable by the user. For example, the user may begin the interactive media with the quiz followed by three video segments, followed by a sketch segment, followed by another quiz. Thus, the users able to easily generate an interactive program comprising various types of media—including audio, videos, sketches, and quizzes—in various different arrangements.

Figure 18:
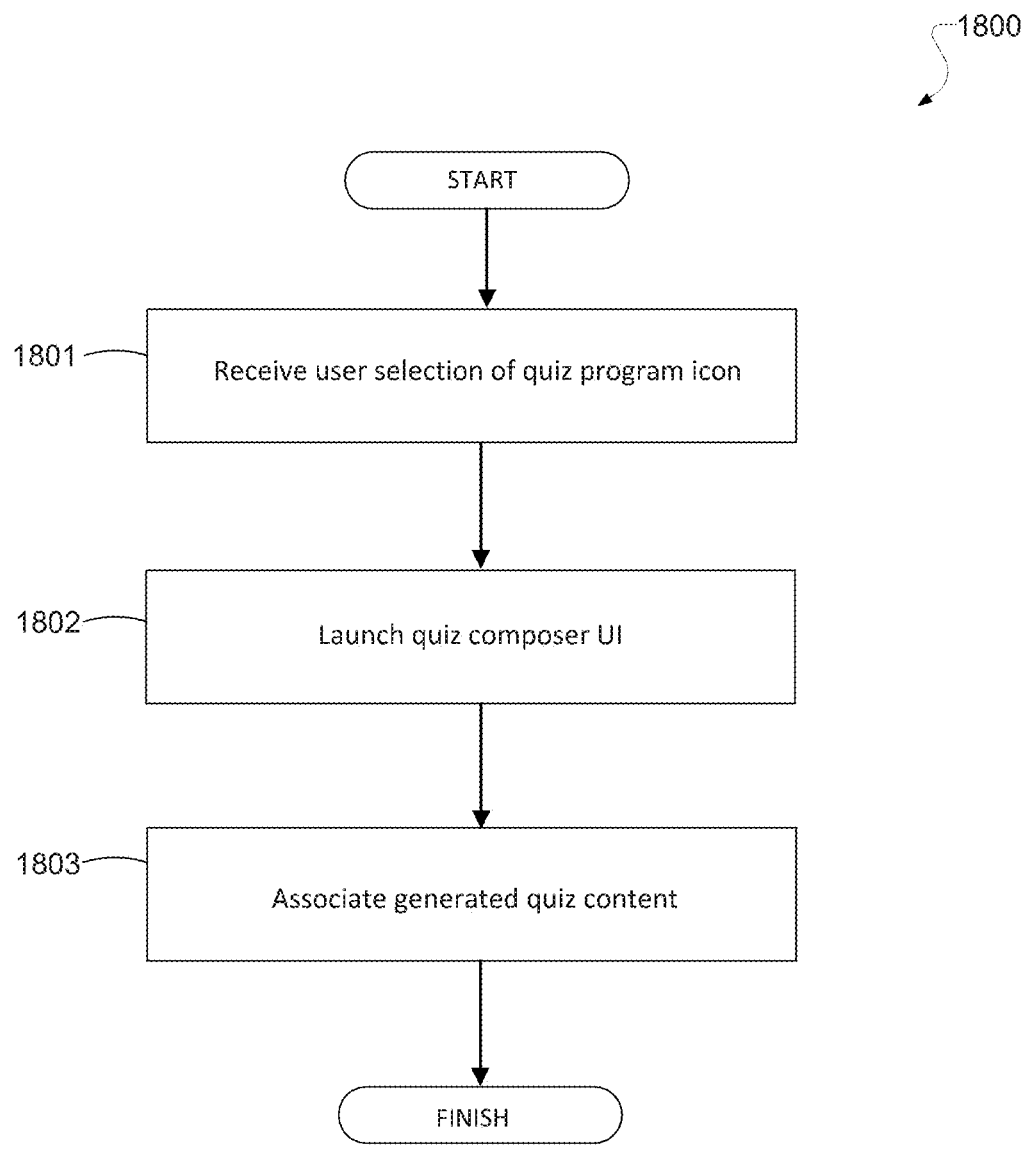
FIG. 18 illustrates an exemplary method, according to various embodiments.

FIG. 18 is a flowchart illustrating an example method 1800, according to various embodiments. The method 1800 may be performed at least in part by, for example, the interactive content creation system 200 illustrated in FIG. 2 (or an apparatus having similar modules, such as client machines 110 and 112 or application server 112 illustrated in FIG. 1). In 1801, the user interface module 202 receives a user selection of a quiz program icon dropped in the precedence graph area. In 1802, a quiz composer UI configured to generate quiz content is launched. In 1803, the user interface module 202 associates the generated quiz content with the quiz program icon, and characterizes the quiz program icon as a program-content-pairing icon that references the quiz content created by the quiz composer UI.

Figure 19:
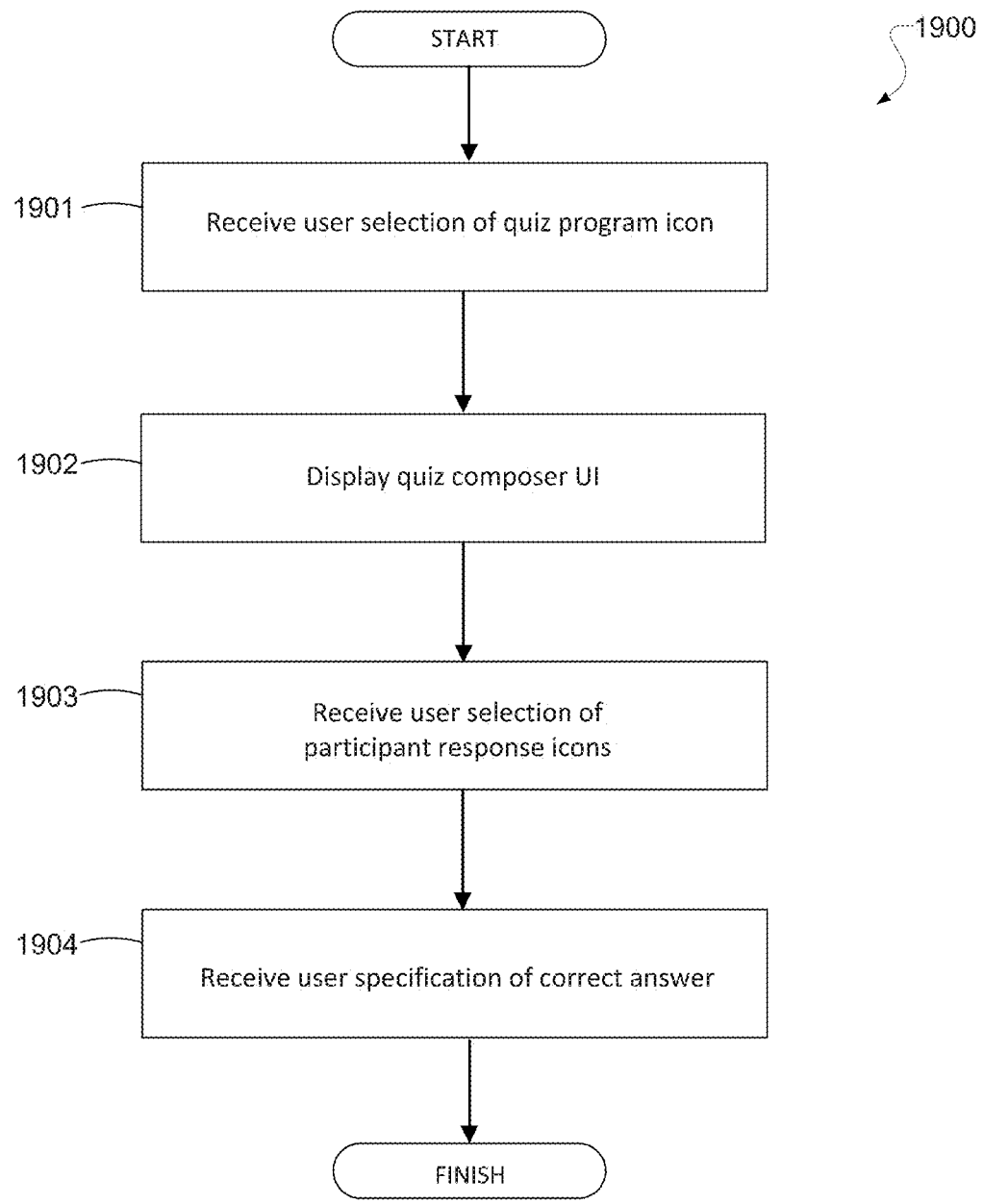
FIG. 19 illustrates an exemplary method, according to various embodiments.

FIG. 19 is a flowchart illustrating an example method 1900, according to various embodiments. The method 1900 may be performed at least in part by, for example, the interactive content creation system 200 illustrated in FIG. 2 (or an apparatus having similar modules, such as client machines 110 and 112 or application server 112 illustrated in FIG. 1). In 1901, the user interface module 202 receives a user selection of a quiz program icon dropped in the precedence graph area. In 1902, a quiz composer UI including a composition area and multiple types of participant response icons is displayed. In 1903, the quiz composer UI receives selection of one or more of the participant response icons, the user selection corresponding to dragging and dropping each selected participant response icon to a specific position in the composition area of the quiz composer UI. In 1904, the quiz composer UI receives user specification of a correct answer associated with one of the dropped participant response icons.

Referring back to FIG. 17B, the illustrated program flow precedence graph is a linear precedence graph, given that only a single connection arrow emanates from each of the dropped icons. According to various exemplary embodiments, when the user interacts with the P#/C# icons in the precedence graph area 310, a user can define an order of the P#/C# icons not only with linear arrow indicators (as described above), but also with branching decision nodes. The decision nodes cause the interactive program to proceed to display one piece of content or another, depending on various conditions. For example, according to various emoluments, a decision node provided between the first and second P#/C# icons in the precedence graph area 310 indicates that the content associated with the second P#/C# icon is to be displayed after display of the content associated with the first P#/C# icon, only if some condition associated with the decision node is satisfied.

Figure 20:
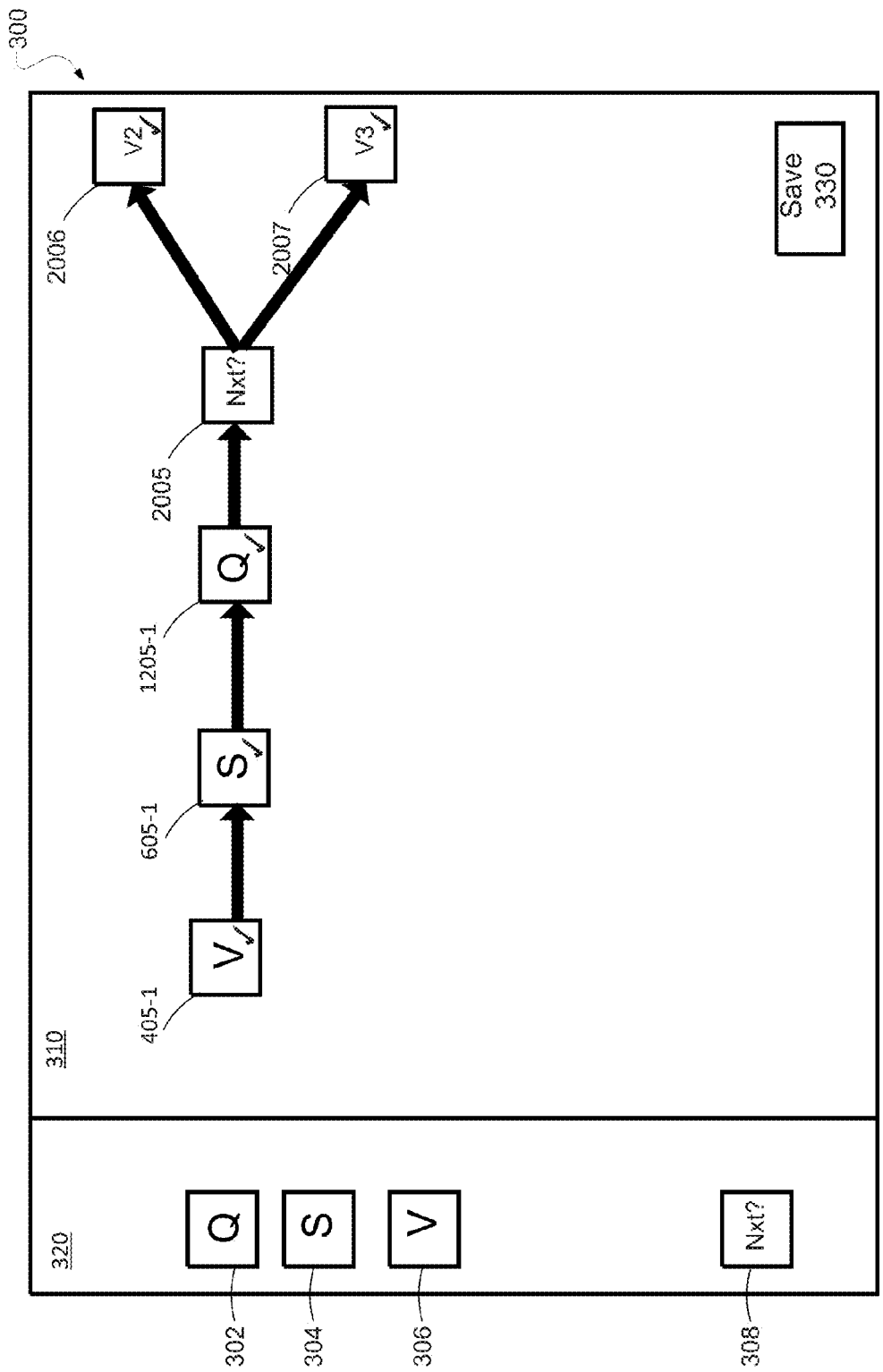
FIG. 20 illustrates an exemplary portion of a user interface window, according to various embodiments.

For example, FIG. 20 illustrates a content creation user interface 300 similar to that illustrated in FIG. 17A. In this example, a user has already placed P#/C# icons 405-1, 605-1, 1205-1, 2006 (referencing a second video), and 2007 (referencing a third video) in the precedence graph area 310. The icon list area 320 also includes a NXT operator 308 corresponding to a decision node. The user may select the NXT operator 308 in the icon list 320, and place it in the precedence graph in order to dynamically controlled branching in an interactive program. For example, NXT operator 2005 has been placed in the precedence graph after the P#/C# icon 1205-1 and before the P#/C# icons 2006 and 2007. As illustrated in the example of FIG. 20, the user has drawn an arrow from P#/C# icon 1205 to NXT operator 2005, and two arrows emanating from NXT operator 2005 going to P#/C# icon 2006 and P#/C# icon 2007.

Figure 21:
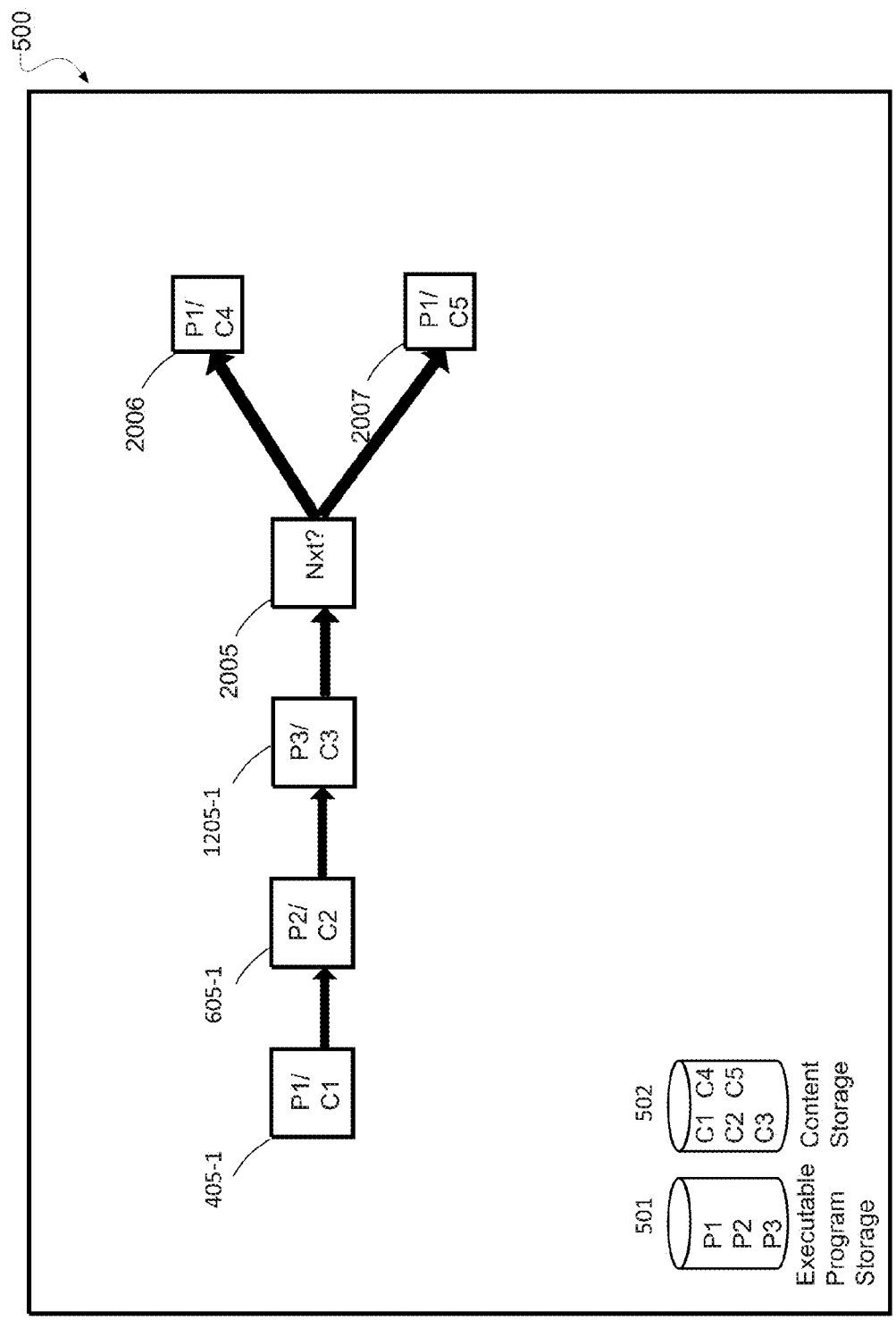
FIG. 21 illustrates a program flow precedence graph, according to various embodiments.

FIG. 21 illustrates an alternative depiction of the precedence graph area 310. As illustrated in FIG. 21, precedence graph area 500 includes P#/C# icon "P1/C4" (which corresponds to the P#/C# icon 2006 illustrated in FIG. 20) and P#/C# icon "P1/C5" (which corresponds to the P#/C# icon 2007 illustrated in FIG. 20). "P1/C4" indicates that "program 1" (e.g., the video composer UI) generates "content 4", and "P1/C5" indicates that "program 1" (e.g., the video composer UI) generates "content 5". As illustrated in FIG. 21, an executable program storage 501 stores executable programs P1, P2, P3 which may correspond to the video composer UI, sketch composer UI, and quiz composer UI described in this disclosure. Further, content storage 502 stores content created by these executable programs, including the aforementioned content "C4" and "C5".

When the user selects the NXT operator 2005 in the precedence graph area 310 of FIG. 20, the user may be able to set the branching conditions for this decision node. According an exemplary embodiment, the branching conditions for a decision node may be defined in terms of a specific performance value associated with a quiz. For example, since the quiz content referenced by the P#/C# icon 1205-1 includes a number of questions or exercises (see FIGS. 13A to 16B), and since the quiz composer UI is able to determine when a participant answers each question correctly during execution of the interactive program, a performance value for the quiz associated with the P#/C# icon 1205-1 may be generated during the execution of the interactive program.

For example, the quiz composer UI referenced by the P#/C# icon 1205-1 may display the user interface 2200 of FIG. 22 (perhaps after the user generates the quiz content i.e. after the user selects the finish button in FIG. 16B). The user interface 2200 allows the user to specify a performance value associated with the quiz, where the performance value may equal the number of correct answers, or a percentage of questions answered correctly, or may equal a specific value (e.g. 0 or 1) based on the number of correct answers, and so on, as illustrated in FIG. 22. Thus, when the quiz content associated with the P#/C# icon 1205-1 is displayed during execution of the interactive program, the quiz composer UI or the precedence graph module 204 generates the performance value, based on the performance value criteria specified by the user, and based on inputs by a participant answering questions in the quiz.

Figure 23:
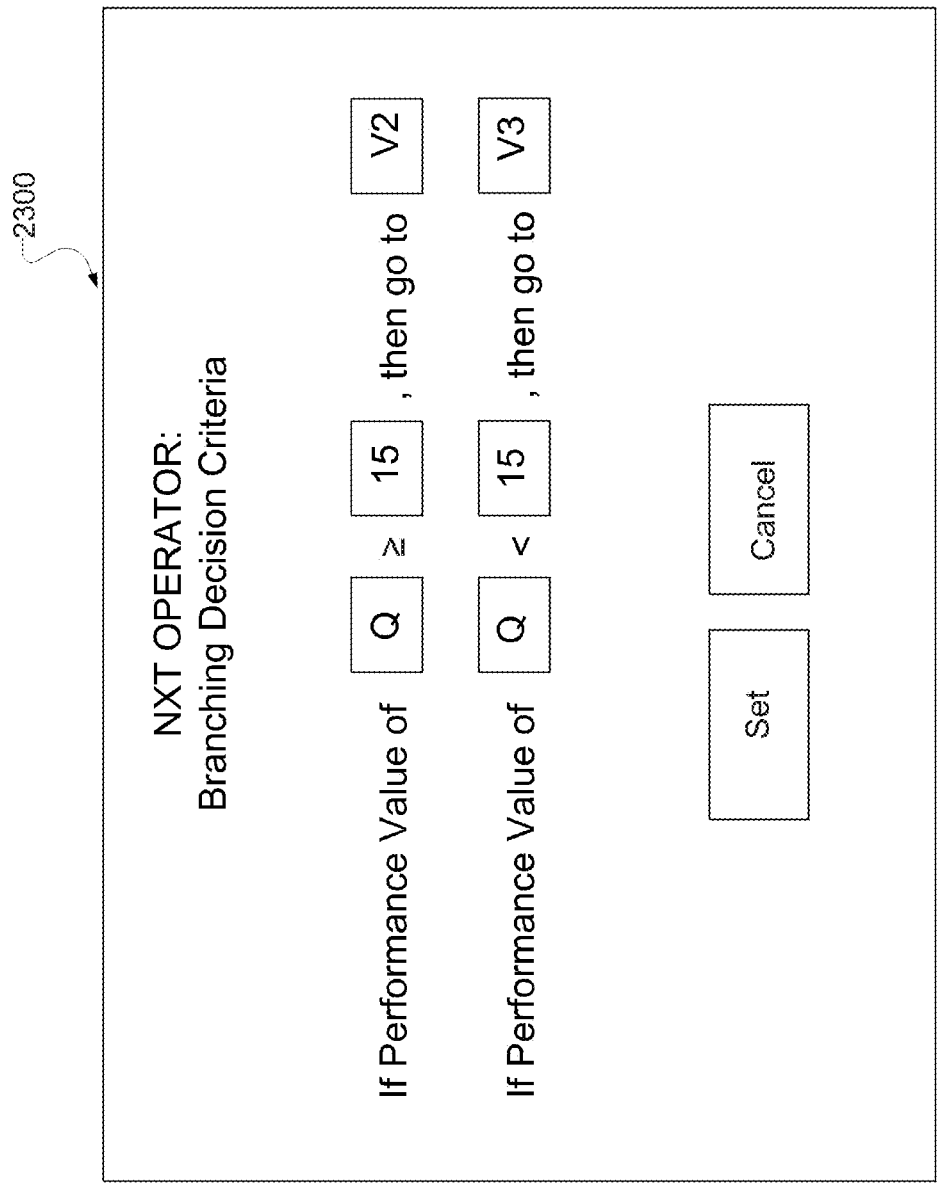
FIG. 23 illustrates an exemplary portion of a user interface window, according to various embodiments.

Thus, the branching conditions for a decision node (e.g., NXT operator 2005) may be defined in terms of the specific performance value associated with a quiz. For example, when the user selects the NXT operator 2005 in the precedence graph area 310 in FIG. 20, the user interface 2300 of FIG. 23 may be displayed to permit the user to set the branching conditions for this decision node. As illustrated in FIG. 23, the user can specify that if the performance value of the quiz associated with the P#/C# icon 1205-1 "Q" satisfies a condition (e.g., greater than or equal to 15), then the program flow of the precedence graph will proceed to P#/C# icon 2006 "V1". On the other hand, the user can specify that if the performance value of the quiz associated with the P#/C# icon 1205-1 "Q" satisfies another condition (e.g., less than 15), then the program flow of the precedence graph will proceed to P#/C# icon 2007 "V3". As illustrated in FIG. 23, the P#/C# icons listed in the user interface 2300 may be automatically prefilled for the convenience of the user, based on the arrows connected to the decision node and the P#/C# icons connected to those arrows. Thus, the program flow of the program flow precedence graph illustrated in FIG. 21 indicates that, during execution of the interactive program, if the viewer answers 15 or more questions correctly in the quiz associated with P#/C# icon 1205-1, then the user will be shown the video associated with P#/C# icon 2006. On the other hand, if the viewer answers less than 15 questions correctly in the quiz associated with P#/C# icon 1205-1, then the user will be shown in the video associated with P#/C# icon 2007.

Thus, the performance value provides qualitative criteria for branching decisions by the NXT operator. For example, when a student completes a quiz, a score is determined and a branching decision is made based upon the performance value of the score. The NXT operator can be "programmed" by placing a condition on the branch in the precedence graph to be dependent upon input provided by the student, i.e. quiz answers. Thus, the system 200 provides an interface to (1) define the quiz (2) define the format (UI) in which the quiz is presented to the student and (3) to condition branching through the program upon quiz answers.

Figure 24:
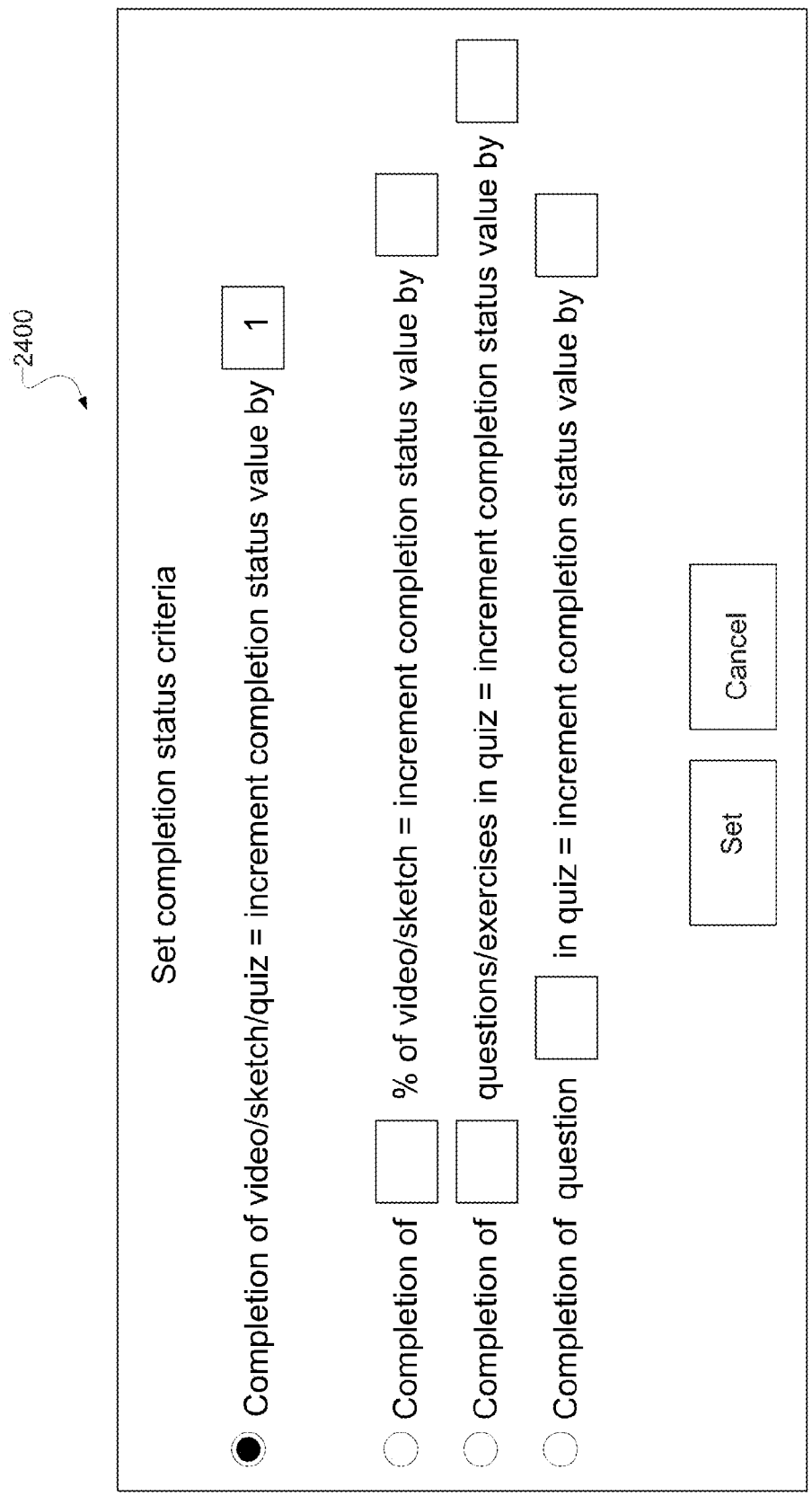
FIG. 24 illustrates an exemplary portion of a user interface window, according to various embodiments.

According another exemplary, the branching conditions for a decision node may be defined in terms of a global completion status value maintained during execution of an interactive program. The completion status value may be similar to a global variable and generated during each execution of the interactive program. The user may define how the global variable is to be incremented by each P#/C# icon in the program flow. For example, according to an exemplary embodiments, when the user associates content with each icon in order to generate a P#/C# icon, the user may be presented with the user interface 2400 illustrated in FIG. 24, which allows the user to specify how the completion status value will be modified by that particular P#/C# icon. For example, as illustrated in FIG. 24, the user may specify that when the participant completes viewing a video, sketch or quiz, the corresponding P#/C# icon is to implement the global completion status value by 1. As other examples, the user may specify that the global completion status value may be incremented after the participant completes viewing a specific percentage of a video/sketch, or completes a specific number of questions/exercises in the quiz, or completes a specific question in the quiz, and the like, as illustrated in FIG. 24. Thus, the completion status value is modified by one or more P#/C# icons during execution of the interactive program, based on criteria defined by the user and participant input received by participant during the execution of the interactive program.

Figure 25:
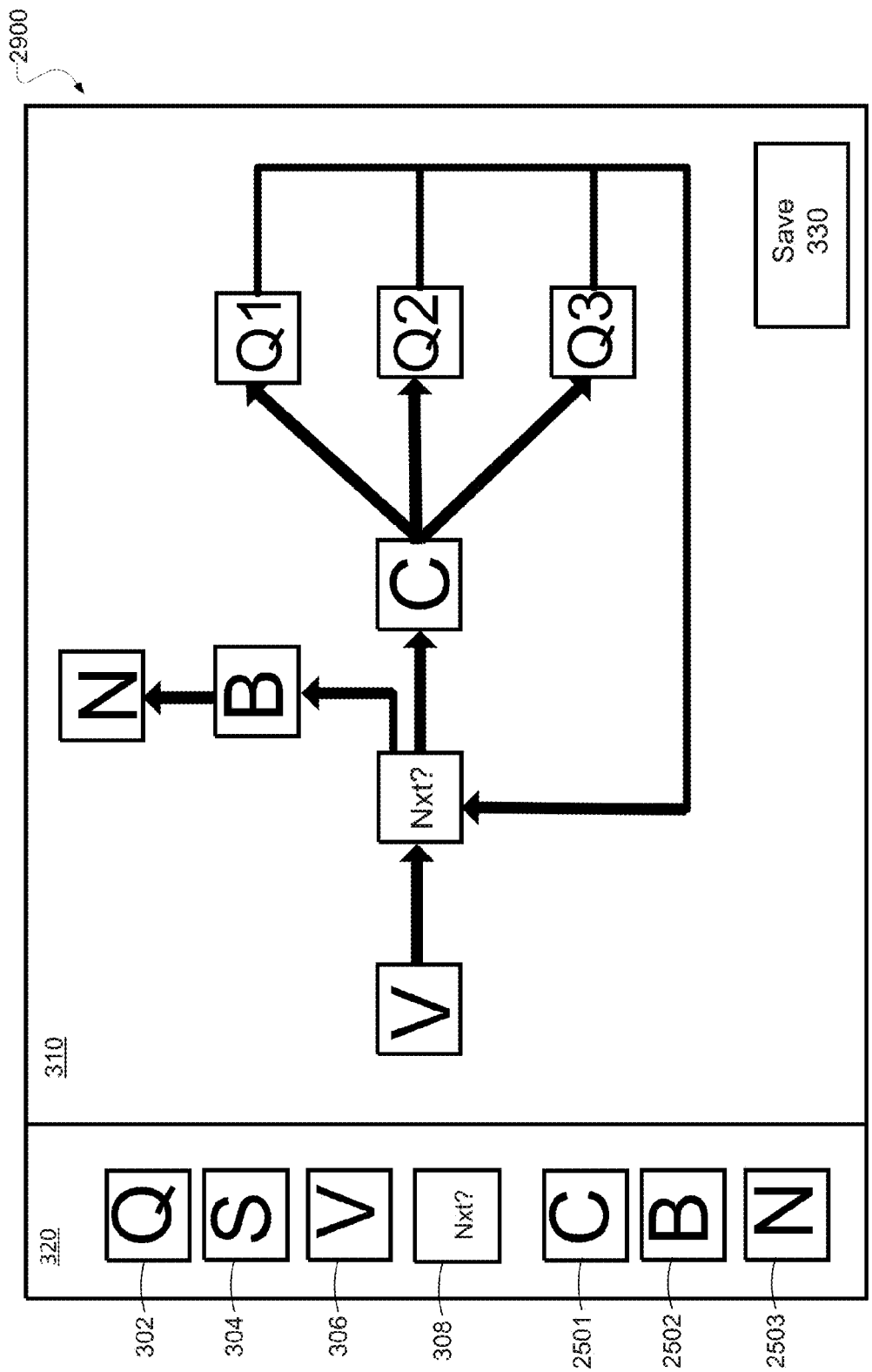
FIG. 25 illustrates an exemplary portion of a user interface window, according to various embodiments.

FIG. 25 illustrates another program flow precedence graph for an interactive program that utilizes the aforementioned global completion status value. The icon list 320 and the precedence graph in FIG. 25 includes a choice icon 2501 (similar to the multiple-choice question of a quiz, and configured to receive user selection of one of a number of choice such as whether the user wants to take the quiz Q1, Q2, or Q3), as well a badge icon 2502 (configured to award credits to a participant of the interactive program), and a notification icon 2503 (configured to automatically transmit a message to an address associated with a participant of the interactive video).

Figure 26:
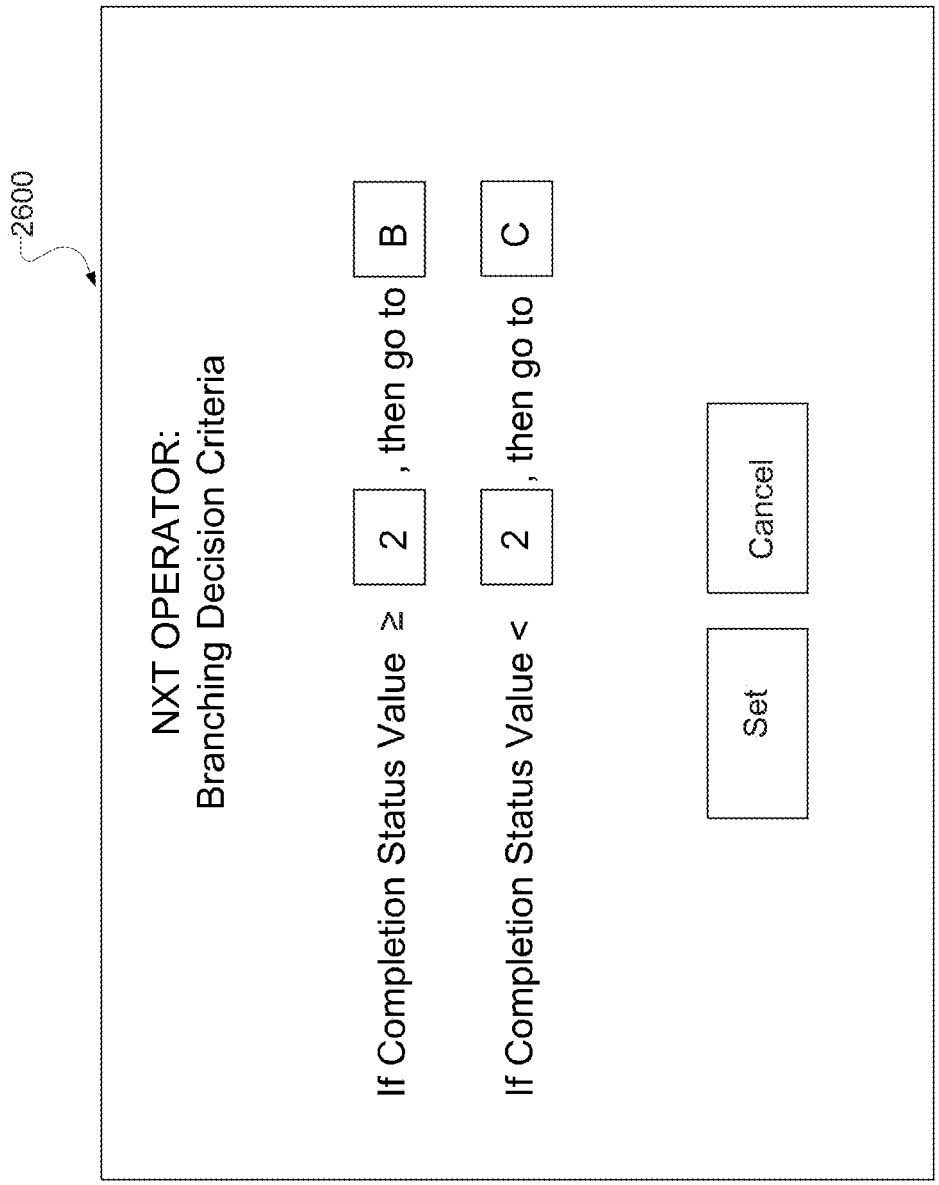
FIG. 26 illustrates an exemplary portion of a user interface window, according to various embodiments.

As illustrated in FIG. 25, the program flow described in the program flow precedence graph indicates that a video is to be displayed first. Thereafter, the decision node makes a branching decision based on the value of a global completion status value. When the user selects the decision node in the precedence graph area, the user interface 2600 of FIG. 26 may be displayed to permit the user to set the branching conditions for this decision node. As illustrated in FIG. 26, the user can specify that if the completion status value satisfies a condition (e.g., greater than or equal to 2), then the program flow of the precedence graph will proceed to the badge icon B. On the other hand, the user can specify that if the global status value satisfies another condition (e.g., less than 2), then the program flow of the precedence graph will proceed to choice icon C. Referring back to FIG. 25, when the user generates the three quizzes associated with the quiz P#/C# icons Q1, Q2, Q3, the user may instruct each P#/C# icon Q1, Q2, Q3 to increment the completion status value based on the criteria illustrated in FIG. 24. That is, the user may specify that when a participant completes a quiz, the corresponding P#/C# icon is to implement the global completion status value by 1 (assuming the global completion status value originally has a value of 0). As illustrated in FIG. 25, after one of the quizzes Q1, Q2, Q3 is completed, the program flow returns to the decision node.

Thus, the decision node makes a branching decision based on the number of quizzes completed by the user. If the global completion status value is less than 2 (i.e., if the user has only completed 1 quiz or has not completed any quizzes) then the user is presented with the choice of which quiz to take via the choice icon C. On the other hand, if the global completion status value is greater than or equal to 2 (i.e., if the user has completed at least 2 quizzes), then the program flow proceeds to the badge icon B and then the notification icon N. Thus, the completion status may be used as a global value to make branching decisions by a NXT operator based upon 'where you are' in the program. For example, in a math course, a student may be required to complete at least 15 of 20 exercises in a quiz, or at least two out of three quizzes, etc., before advancing to the next segment of the course. The completion status keeps track of how many exercises or quizzes the student has completed.

Figure 27:
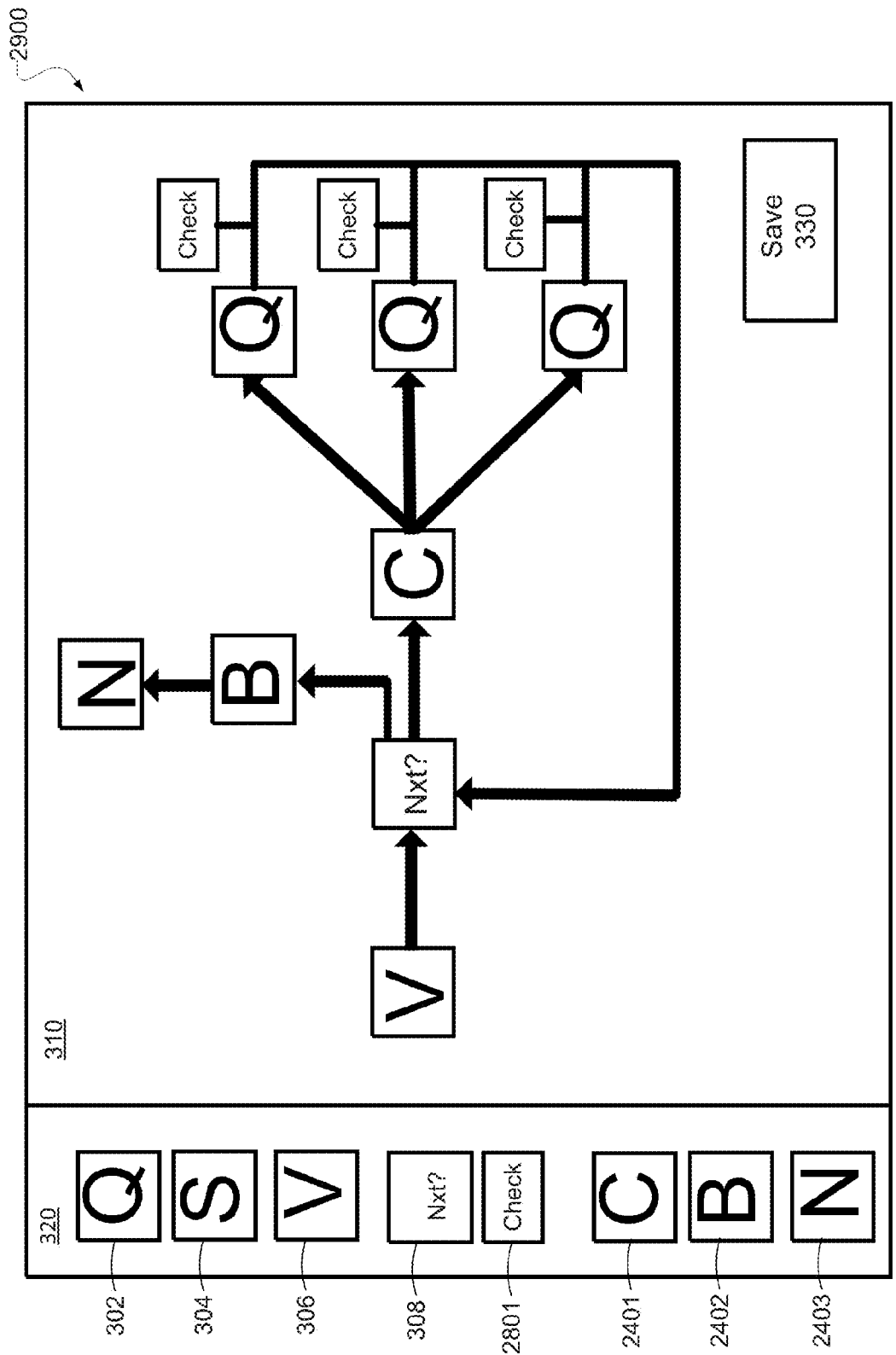
FIG. 27 illustrates an exemplary portion of a user interface window, according to various embodiments.

According to another exemplary embodiment, the user may place completion status checkpoint icons at various positions in the precedence graph, where the global completion status value is incremented if those checkpoints are accessed during the program flow referenced by the precedence graph. For example, FIG. 27 illustrates the program flow precedence graph similar to that illustrated in FIG. 25. The icon list 320 includes completion status checkpoint icon 2801 that the user may move into the precedence graph area 310. As seen in FIG. 27, the user has placed three completion status checkpoint icons in the precedence graph, one after each quiz Q1, Q2, Q3. The precedence graph is otherwise similar to the precedence graph illustrated in FIG. 25, and the results of the execution of the interactive program in FIG. 27 and FIG. 25 is the same.

According to various embodiments, the content creation user interface window 300 may also include a publisher icon (not illustrated), that generates a uniform resource locator (URL) to access the interactive video represented by the program flow precedence graph in the precedence graph area 310.

Figure 28:
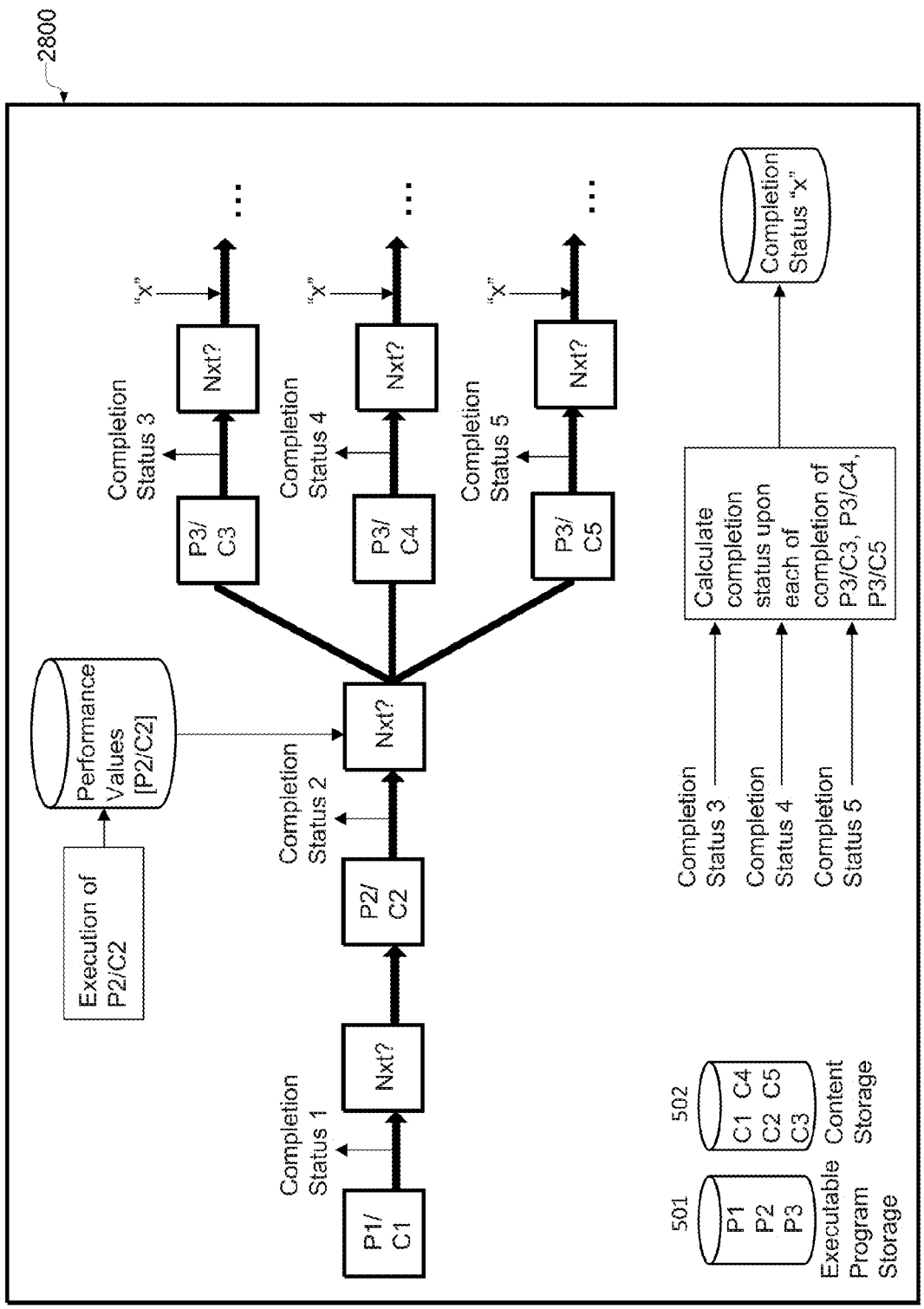
FIG. 28 illustrates an exemplary program stored in a computer readable storage device, according to various embodiments.

FIG. 28 is an illustrative drawing representing a computer program to configure a computer to perform a process composed using UI functionality in accordance with some embodiments. The computer program is stored in a computer readable storage device. As described above, the program is represented by the precedence graph that includes P#/C# icons and decision nodes. P1/C1 represents an information structure stored in the storage device that indicates that "program 1" is used to configure a computer to display/present "content 1". NXT indicates a decision node in the precedence graph to determine the next P#/C# to execute. In an exemplary embodiment, the default next P#/C# to execute is the next P#/C# indicated by the next data structure in order in the graph, as indicated by the arrow connectors in FIG. 28. If the composer does not explicitly specify a special ordering of execution using a decision node, then the default ordering as specified by the arrow connectors and or the arrangement of the P#/C# icons is used. Put another way, if the user does not insert a NXT operator between P#/C# icons (or if no conditions are associated with this NXT operator), then the ordering as indicated by arrangement in the UI (e.g., in the precedence graph area 310 illustrated in FIG. 3) is the default precedence, and program flow proceeds in the order indicated by the placement of icons in the UI.

As described above, in composing the program, the composer can place upon the NXT operators performance criteria that are the result of student input, and completion status criteria (global variable is) indicative of 'where you are' in the program. These criteria can be used separately or together to determine the next stage of the program to transition to. The default is to transition to the next stage "in order" in the layout created by the user.

Moreover, as described in various exemplary embodiments, a program icon (e.g., one of the program icons 302, 304, and 306 illustrated in FIG. 3) references a UI of a composing program to generate content in a certain media, e.g., video, audio, sketching, quizzes, tests, etc. However, after the content has been associated with a given node of the program represented by a program icon, the program icon then refers to the P#/C# combination that is operative to present the content created by the composer UI. At that point, the icon represents a P/#C# pair that can be 'hooked' into a program flow using a precedence graph.

Thus, according to an aspect, an icon transforms in significance from a call to a UI to create content (e.g., one of the program icons 302, 304, and 306 illustrated in FIG. 3) to a P/#C# pair that can be 'hooked', through use of respective data structure indicating the respective pair, into the program flow (see FIG. 28). Put another way, the composer first interacts with an icon to access a composer UI for a media represented by the icon. Secondly, the composer interacts with the same icon, except that the icon now represents a P/#C# pair in a precedence graph, and the composer's interaction with the P#/C# pair involves 'hooking' the P/#C# pair into a program flow represented by the precedence graph. In this second interaction, the composer may interact with the precedence graph by placing NXT operators on the precedence graph to dynamically control branching between the various P#/C# icons. The NXT operators may be dependent upon performance variables, which may be created and specified by the composer during the first interaction with a program icon (where the composer may specify that performance results should be stored at 'some' memory location). The NXT operator may be conditioned to make a branch decisions based upon the performance value stored at the memory location.

Figure 29:
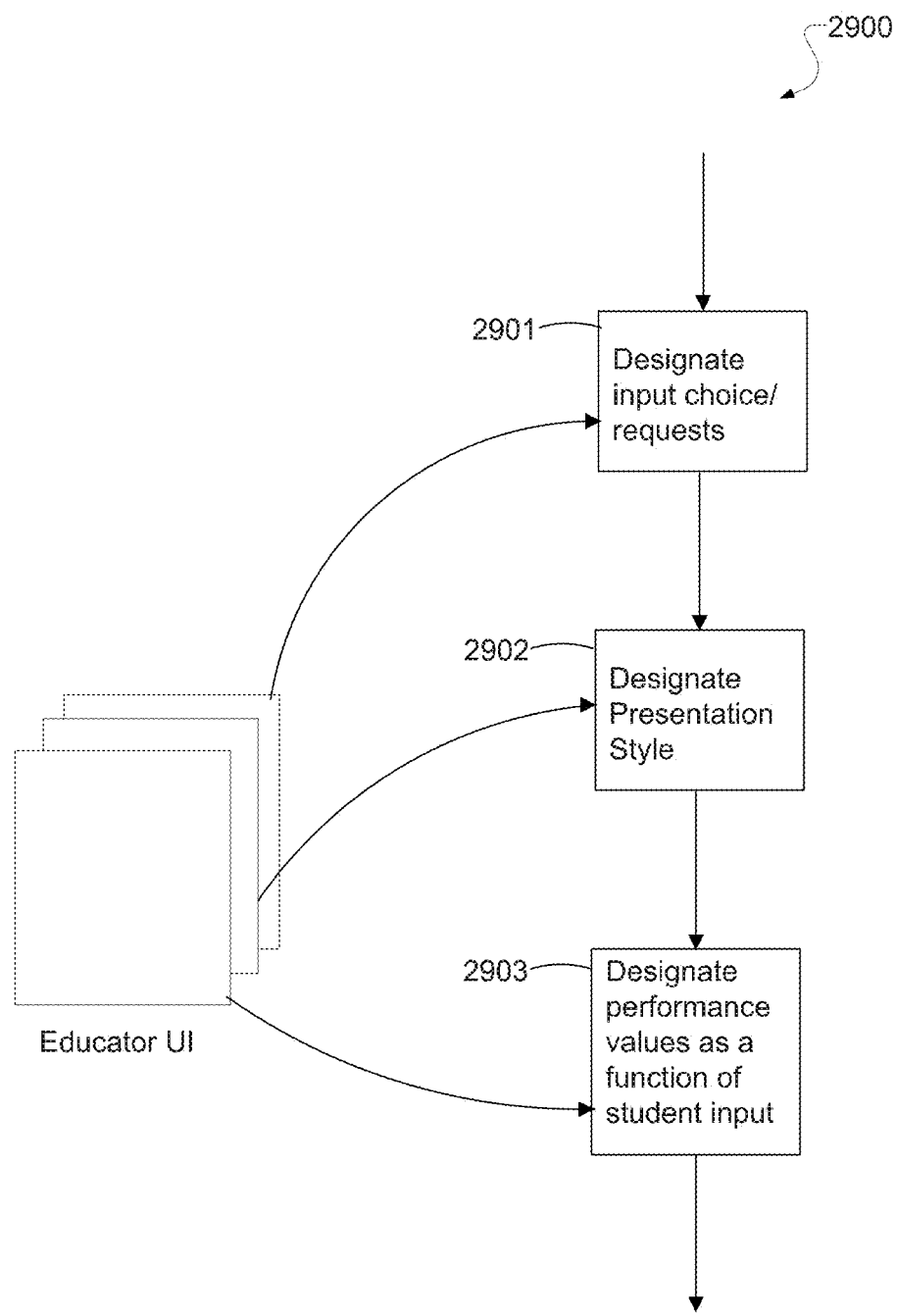
FIG. 29 illustrates an exemplary method, according to various embodiments.

FIG. 29 represents the composer UI (e.g., an educator UI) involved with creating a quiz UI. There are a series of screen displays that require the composer (e.g., an educator) to perform the three "Designate" steps 2901, 2902, and 2903. In 2901, the composer designates various input choices (e.g., see FIGS. 13A through 16B). In 2902, the composer designates a presentation style (e.g., using buttons 1320-1328 illustrated in FIG. 13A). In 2903, the composer designates performance values as a function of student input (e.g., as a function of a number of corrects answers received by a student, see FIG. 22).

Figure 30A:
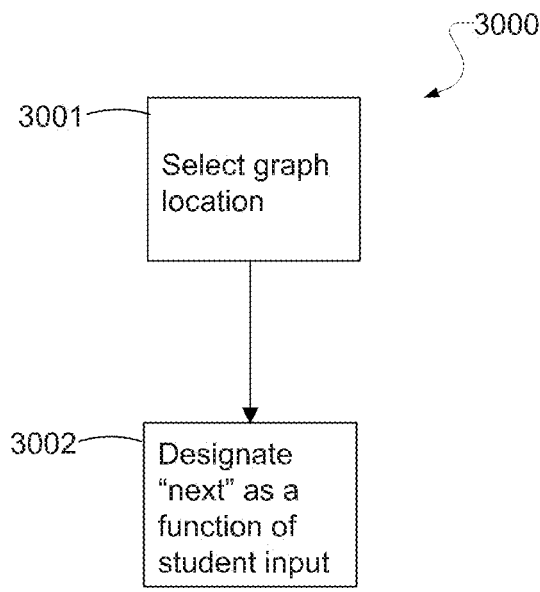
FIG. 30A illustrates an exemplary method, according to various embodiments.
Figure 30B:
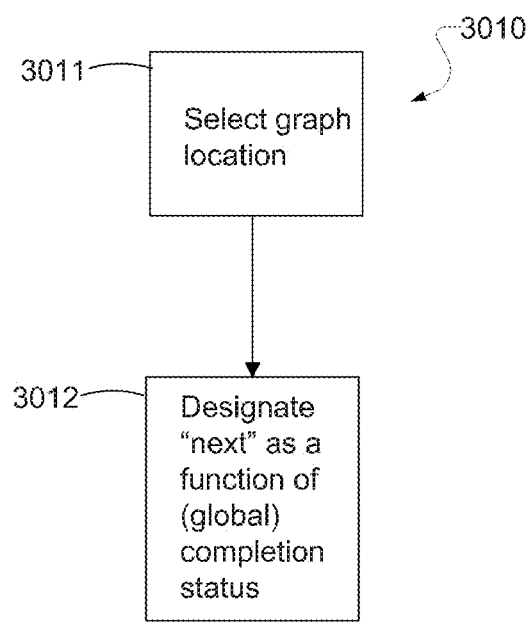
FIG. 30B illustrates an exemplary method, according to various embodiments.

FIG. 30A represents composer action in defining a performance-based branch associated with a NXT operator associated with a branching decision. In 3001, a composer selects a location in a precedence graph (e.g., see FIG. 20, where the user drags the NXT operator 308 to a location in the precedence graph). In 3002, the composer designates branching decision criteria for the NXT operator (e.g., specifies the 'next' P#/C# icon to go to) based on performance values (see FIG. 23). FIG. 30B represents composer action in defining a (global) completion status-based branch associated with a NXT operator associated with a branching decision. In 3011, a composer selects a location in a precedence graph (e.g., see FIG. 25, where the user drags the NXT operator 308 to a location in the precedence graph). In 3012, the composer designates branching decision criteria for the NXT operator (e.g., specifies the 'next' P#/C# icon to go to), based on a completion status value (see FIG. 26).

Figure 31:
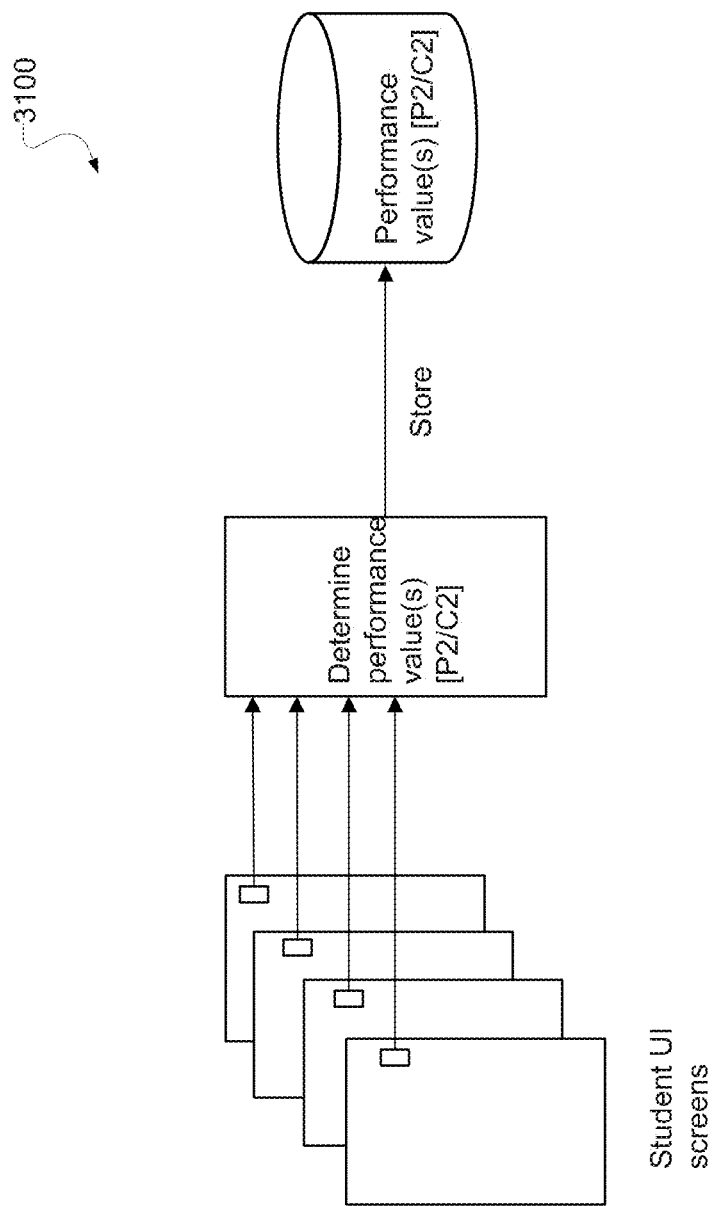
FIG. 31 illustrates an exemplary method, according to various embodiments.

FIG. 31 represents the screen displays in which a quiz (such as the quiz generated in FIGS. 13A through 16B) is presented to a student and in which a student presents answers, which are used to generate performance values based on various criteria (see FIG. 22). The performance results are stored in a designated location that is accessed by the NXT operator (as described in FIG. 30A) to make a branching decision.

While embodiments of this disclosure describe examples based on educator/student relationships, the embodiments of this disclosure are of course applicable more broadly than to educator/student relationships. For example, the same concepts could be applicable to a "scavenger hunt" or to a "museum tour" or any environment where participants are required to make a selection from among a plurality of choices displayed to the participant.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 32:
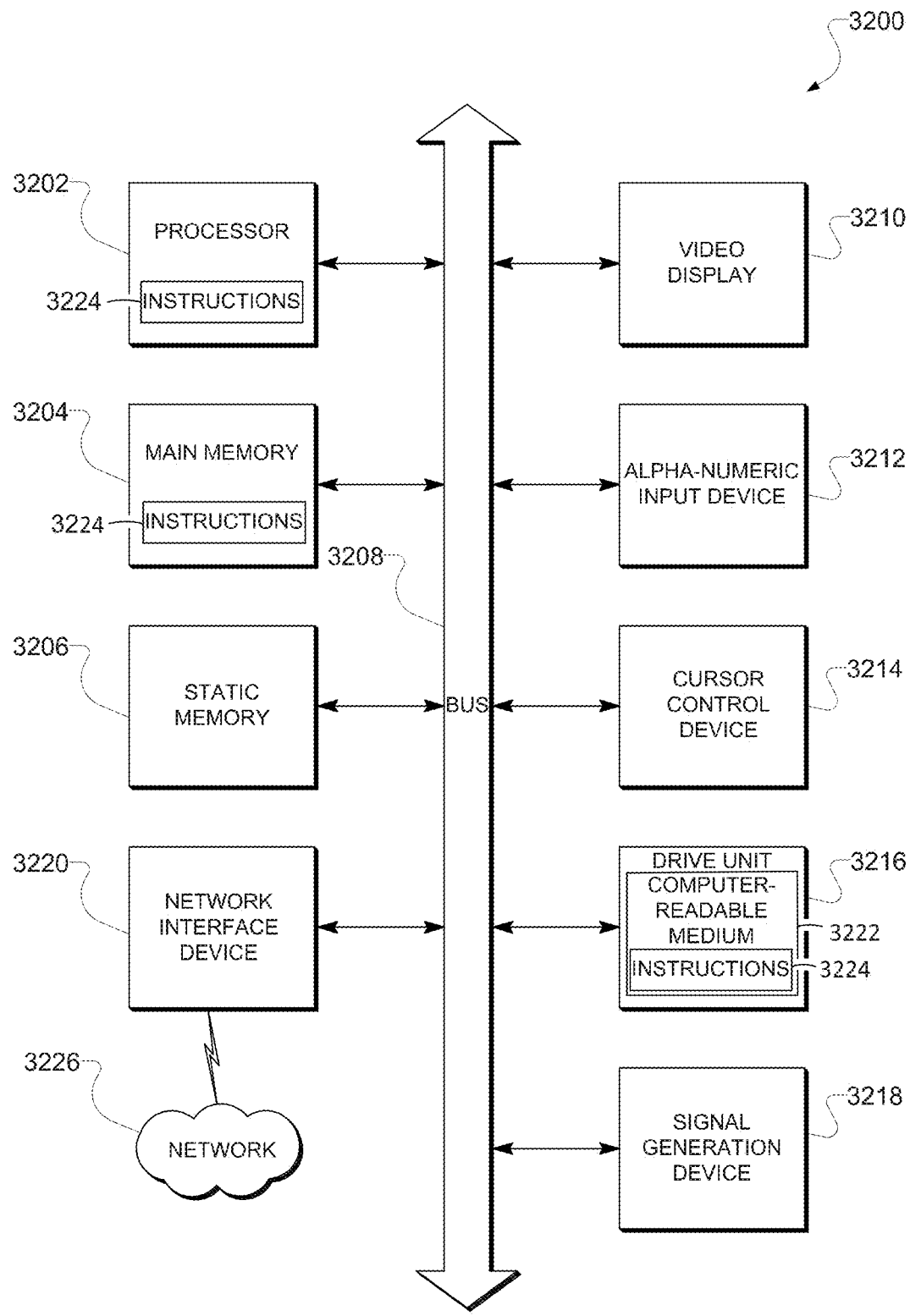
FIG. 32 is a diagrammatic representation of a machine in the example form of a computer system within which a set of instructions, for causing the machine to perform any one or more of the methodologies discussed herein, may be executed.

FIG. 32 is a block diagram of machine in the example form of a computer system 3200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (P#/C#), a tablet P#/C#, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3200 includes a processor 3202 (e.g., a central processing unit (CPU), a graphics processing unit (GPU) or both), a main memory 3204 and a static memory 3206, which communicate with each other via a bus 3208. The computer system 3200 may further include a video display unit 3210 (e.g., a liquid crystal display (LCD) or a cathode ray tube (CRT)). The computer system 3200 also includes an alphanumeric input device 3212 (e.g., a keyboard or a touch-sensitive display screen), a user interface (UI) navigation device 3214 (e.g., a mouse), a disk drive unit 3216, a signal generation device 3218 (e.g., a speaker) and a network interface device 3220.

Machine-Readable Medium

The disk drive unit 3216 includes a machine-readable medium 3222 on which is stored one or more sets of instructions and data structures (e.g., software) 3224 embodying or utilized by any one or more of the methodologies or functions described herein. The instructions 3224 may also reside, completely or at least partially, within the main memory 3204 and/or within the processor 3202 during execution thereof by the computer system 3200, the main memory 3204 and the processor 3202 also constituting machine-readable media.

While the machine-readable medium 3222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 3224 may further be transmitted or received over a communications network 3226 using a transmission medium. The instructions 3224 may be transmitted using the network interface device 3220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

displaying, on a client device, a user interface (UI) including a precedence graph area and an icon list displaying multiple types of program icons;

receiving a user selection of one of the program icons, the user selection corresponding to moving the selected program icon to the precedence graph area, the selected program icon referencing a composer UI to generate content of a specific media type;

associating the generated content with the selected program icon, and characterizing the selected program icon as a first program-content-pairing icon that references the content created by the composer UI;

detecting a user interaction with a plurality of program-content-pairing icons in the precedence graph area, the user interaction corresponding to specifying an ordering of the plurality of program-content-pairing icons; and generating a program flow precedence graph referencing a program flow of an interactive program, based on the ordering of the program-content-pairing icons in the precedence graph area, each of the plurality of program-content-pairing icons in the precedence graph area being configured to modify a particular global completion status value, based on completion status criteria associated with each of the program-content-pairing icons, the completion status criteria associated with one or more of the program-content-pairing icons specifying that the particular global completion status value is to be modified, responsive to user completion of a specific percentage of video content or sketch content, and the ordering of the plurality of program-content-pairing icons in the precedence graph being specified via a decision node in the precedence graph area, based on a value of the particular global completion status value received by the decision node during execution of the interactive program.

2. The method of claim 1, further comprising:

executing the interactive program based on the program flow referenced by the program flow precedence graph.

3. The method of claim 1, wherein the ordering is specified at least in part via an arrow connector between first and second program-content-pairing icons in the precedence graph area, the arrow connector indicating that content associated with the second program-content-pairing icon is to be displayed immediately after display of content associated with the first program-content-pairing icon during execution of the interactive program.

4. The method of claim 3, wherein the arrow connector is generated based on manual user input of a line between the first and second program-content-pairing icons in the precedence graph area.

5. The method of claim 3, wherein the arrow connector is generated automatically based on respective positions of the first and second program-content-pairing icons in the precedence graph area.

6. The method of claim 5, wherein the respective positions are defined by user manipulation of an arrangement of the first and second program-content-pairing icons in the precedence graph area.

7. The method of claim 1, wherein the decision node is positioned between first and second program-content-pairing icons in the precedence graph area,
the decision node indicating that, after a condition is satisfied, content associated with the second program-content-pairing icon is to be displayed after display of content associated with the first program-content-pairing icon during execution of the interactive program.

8. The method of claim 7, wherein the condition is specified based at least in part on a specific performance value associated with the first program-content-pairing icon, the performance value being received by the decision node during execution of the interactive program.

9. The method of claim 7, wherein the condition is specified based at least in part on the particular global completion status value received by the decision node during execution of the interactive program.

10. The method of claim 1, wherein the composer UI referenced by the selected program icon generates quiz content and receives a user specification of performance value criteria for determining a performance value.

11. The method of claim 10, wherein the performance value is generated after display of the quiz content during execution of the interactive program, based on the performance value criteria and participant input received during the display of the quiz content.

12. The method of claim 10, wherein the performance value criteria indicates that the performance value is determined based on a number of correct answers input by a participant during the display of the quiz content.

13. The method of claim 1, wherein the composer UI referenced by the selected program icon generates the content and receives a user specification of the completion status criteria associated with the corresponding program-content-pairing icon for modifying the particular global completion status value.

14. The method of claim 13, wherein the particular global completion status value is modified after display of the content during execution of the interactive program, based on the completion status criteria and participant input received during the display of the content.

15. The method of claim 1, further comprising receiving a user selection of a completion status checkpoint icon displayed in the icon list, the user selection corresponding to moving the completion status checkpoint icon between two program-content-pairing icons in the program flow precedence graph.

16. The method of claim 15, wherein the particular global completion status value is incremented after the completion status checkpoint icon is accessed during execution of the interaction program.

17. The method of claim 1, further comprising:
receiving a user selection of a quiz program icon in the precedence graph area;
displaying, on the client device, a quiz composer UI including a composition area and multiple types of participant response icons;
receiving user selection of one or more of the participant response icons, the user selection corresponding to moving each selected participant response icon to a specific position in the precedence graph area; and
receiving user specification of a correct answer associated with one of the moved participant response icons.

18. The method of claim 17, wherein the multiple types of participant response icons include a true-false input participant response icon, a multiple choice input participant response icon, a text input participant response icon and a numerical input participant response icon.

19. A non-transitory machine-readable storage medium having embodied thereon instructions executable by one or more machines to perform operations comprising:
displaying, on a client device, a user interface (UI) including a precedence graph area and an icon list displaying multiple types of program icons;
receiving a user selection of one of the program icons, the user selection corresponding to moving the selected program icon to the precedence graph area, the selected program icon referencing a composer UI to generate content of a specific media type;
associating the generated content with the selected program icon, and characterizing the selected program icon as a first program-content-pairing icon that references the content created by the composer UI;
detecting a user interaction with a plurality of program-content-pairing icons in the precedence graph area, the user interaction corresponding to specifying an ordering of the plurality of program-content-pairing icons; and
generating a program flow precedence graph referencing a program flow of an interactive program, based on the ordering of the program-content-pairing icons in the precedence graph area,
each of the plurality of program-content-pairing icons in the precedence graph area being configured to modify a particular global completion status value, based on completion status criteria associated with each of the program-content-pairing icons,
the completion status criteria associated with one or more of the program-content-pairing icons specifying that the particular global completion status value is to be modified, responsive to user completion of a specific percentage of video content or sketch content, and
the ordering of the plurality of program-content-pairing icons in the precedence graph being specified via a decision node in the precedence graph area, based on a value of the particular global completion status value received by the decision node during execution of the interactive program.

20. A system comprising:
a machine including a memory and at least one processor;
a user interface module configured to:
display, on a client device, a user interface (UI) including a precedence graph area and an icon list displaying multiple types of program icons;
receive a user selection of one of the program icons, the user selection corresponding to moving the selected program icon to the precedence graph area, the selected program icon referencing a composer UI to generate content of a specific media type; and
associate the generated content with the selected program icon, and characterizing the selected program icon as a first program-content-pairing icon that references the content created by the composer UI; and
a precedence graph module, executable by the machine, configured to:
detect a user interaction with a plurality of program-content-pairing icons in the precedence graph area, the user interaction corresponding to specifying an ordering of the plurality of program-content-pairing icons; and generate a program flow precedence graph referencing a program flow of an interactive program, based on the ordering of the program-content-pairing icons in the precedence graph area, each of the plurality of program-content-pairing icons in the precedence graph area being configured to modify a particular global completion status value, based on completion status criteria associated with each of the program-content-pairing icons, the completion status criteria associated with one or more of the program-content-pairing icons specifying that the particular global completion status value is to be modified, responsive to user completion of a specific percentage of video content or sketch content, and the ordering of the plurality of program-content-pairing icons in the precedence graph being specified via a decision node in the precedence graph area, based on a value of the particular global completion status value received by the decision node during execution of the interactive program.

* * * * *